(12) United States Patent
Shimizu et al.

(10) Patent No.: US 7,976,965 B2
(45) Date of Patent: Jul. 12, 2011

(54) MAGNETIC RECORDING MEDIUM AND MAGNETIC RECORDING AND REPRODUCING DEVICE

(75) Inventors: Kenji Shimizu, Ichihara (JP); Junichi Kishimoto, Ichihara (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 12/544,599

(22) Filed: Aug. 20, 2009

(65) Prior Publication Data
US 2010/0046116 A1 Feb. 25, 2010

(30) Foreign Application Priority Data

Aug. 22, 2008 (JP) ................. 2008-213469

(51) Int. Cl.
*G11B 5/66* (2006.01)

(52) U.S. Cl. .............. 428/828.1; 428/829; 428/830; 428/836.2; 360/133

(58) Field of Classification Search ............... None
See application file for complete search history.

(56) References Cited

U.S. PATENT DOCUMENTS

| 6,830,824 B2 * | 12/2004 | Kikitsu et al. | 428/828.1 |
| 2003/0087135 A1 * | 5/2003 | Wang et al. | 428/695 |
| 2006/0147759 A1 * | 7/2006 | Lee et al. | 428/830 |
| 2006/0204791 A1 * | 9/2006 | Sakawaki et al. | 428/828.1 |
| 2007/0072011 A1 * | 3/2007 | Li et al. | 428/828.1 |
| 2007/0292720 A1 * | 12/2007 | Suess | 428/828.1 |
| 2008/0070065 A1 * | 3/2008 | Berger et al. | 428/828.1 |
| 2008/0180843 A1 * | 7/2008 | Zhang et al. | 360/135 |

FOREIGN PATENT DOCUMENTS

JP        2005-276410 A    10/2005

* cited by examiner

*Primary Examiner* — Kevin M Bernatz
(74) *Attorney, Agent, or Firm* — Sughrue Mion, PLLC

(57) ABSTRACT

A magnetic recording medium comprises a nonmagnetic substrate on which is disposed at least a vertical magnetic layer. The vertical magnetic layer comprises at least three layers including a lower layer, an intermediate layer and an upper layer from the substrate side. The lower, intermediate and upper magnetic layers are bound by ferro-coupling and are constituted of magnetic particles which are columnar crystals extending continuously from the lower layer to the upper layer. A nonmagnetic layer is between the lower and intermediate magnetic layers or between the intermediate and upper magnetic layers. The upper layer has a magnetic anisotropic constant (Ku) from $0.8 \times 10^6$ to $4 \times 10^6$ (erg/cc), the intermediate layer has a magnetic anisotropic constant (Ku) from $2 \times 10^6$ to $7 \times 10^6$ (erg/cc) and the lower layer has a magnetic anisotropic constant (Ku) from $1 \times 10^6$ to $4 \times 10^6$ (erg/cc).

6 Claims, 2 Drawing Sheets

MAGNETIC RECORDING MEDIUM AND MAGNETIC RECORDING AND REPRODUCING DEVICE

BACKGROUND OF THE INVENTION

1. Field of the Invention

The present invention relates to a magnetic recording medium provided with a nonmagnetic substrate on which at least an orientation adjusting layer that controls the orientation of a layer just above the nonmagnetic substrate, a vertical magnetic layer with an axis of easy magnetization primarily oriented vertically to the nonmagnetic substrate and a protective layer are disposed, and to a magnetic recording and reproducing device.

2. Description of the Prior Art

A hard disk drive (HDD) that is a type of magnetic recording and reproducing device is currently increased in recording density at a rate of 50% or more a year and it is said that this trend will be continued after this. This is the reason why the development of a magnetic recording head suitable for high-density recording and the development of a magnetic recording medium are now in progress.

At present, the magnetic recording medium mounted on a commercially available magnetic recording and reproducing device is the so-called vertical magnetic recording medium in which the axis of easy magnetization in the magnetic film is primarily oriented vertically. A vertical magnetic recording medium is reduced in the influence of a diamagnetic field in the boundary region between recording bits with high recording densification and therefore, a clear bit boundary is formed to thereby limit an increase in noise. Also, a reduction in recording bit volume along with high recording densification is eventually small, the vertical magnetic recording medium is also resistant to the heat fluctuation effect. In light of this, there is proposed the structure of a medium suitable for the vertical magnetic recording, this structure attracting remarkable attention in recent years.

Recent studies have been directed to the use of a single pole head having the high ability for writing to the vertical magnetic layer to cope with the desire for higher recording densification of a magnetic recording medium. A magnetic recording medium is proposed which is improved in the efficiency of the rate of change of magnetic flux between the single pole head and the magnetic recording medium by disposing a layer made of a soft magnetic material which is called a backing layer between the vertical magnetic layer which is a recording layer and a substrate, to cope with such a single pole head.

However, when a magnetic recording medium simply provided with a backing layer as mentioned above is used, it can be unsatisfied in recording and reproducing characteristics, heat fluctuation resistance and recording resolution during the course of recording and reproduction and a magnetic recording medium superior in these characteristics is desired.

It is essential matter in high recording densification in the future to attain the compatibility between a high S/N ratio enabling an increase in the ratio (S/N ratio) of signal to noise during the course of reproduction and an improvement in resistance to heat fluctuation, which are particularly important as recording and reproducing characteristics. However, these two items are contrary to each other and specifically, if one of these items is improved, the other is deteriorated, giving rise to an important problem concerning a high level of compatibility between these characteristics.

In order to solve such a problem, the publication of JP-A No. 2005-276410 (Patent Document 1) proposes a magnetic recording medium resistant to a reduction in S/N ratio while enjoying such an advantage that synthetic Mrt and PW50 are dropped by joining three magnetic layers by AFC. Specifically, the above Patent Document 1 discloses a magnetic recording medium provided with a substrate, a first lower ferromagnetic layer disposed on the substrate and having a residual magnetization Mr, a thickness t and a product of a residual magnetization and thickness Mrt, a ferromagnetic coupling layer disposed on the first lower ferromagnetic layer, a second lower ferromagnetic layer which has a Mrt value and is disposed on the ferromagnetic coupling layer, an antiferromagnetic coupling layer disposed on the second lower ferromagnetic layer and an upper ferromagnetic layer which is disposed on the antiferromagnetic coupling layer and has a Mrt value larger than sum of the Mrt values of the above first and second lower ferromagnetic layers.

There are no bounds to the request for high recording densification of a magnetic recording medium, and it is demanded of the magnetic recording medium to have higher recording and reproducing characteristics and to be improved in heat fluctuation characteristics. To cope with such a request, it is considered to form the magnetic layer as a multilayer as described in the above Patent Document 1 and also to combine the multilayered magnetic layers by AFC (anti-ferro coupling). However, there is the problem that magnetization inversion is made difficult, and a reduction in OW and an increase in the width of magnetization inversion become a hindrance to the high recording densification of a magnetic recording medium in the future.

It is an object of the present invention to provide a magnetic recording medium and a magnetic recording and reproducing device which have a high S/N ratio, and are superior in heat fluctuation characteristics and in recording characteristics (OW).

The inventors of the present invention have made earnest studies to attain the above objects and as a result, found that a magnetic recording medium which enables easy magnetization inversion, has a higher S/N ratio than usual, and is superior in heat fluctuation characteristics and in recording characteristics (OW) not by coupling the multilayered magnetic layers by AFC but by adjusting ferro-coupling (coupling with magnetization in the same direction) and magnetostatic coupling to proper ranges and also by designing the Ku of the multilayered magnetic layers to be an optimum value can be provided. The inventors of the present invention also have found that, even if materials which hardly generate magnetization inversion are used, a medium can be provided which attains good OW characteristics and magnetization inversion distribution, has a high S/N ratio and is superior in heat fluctuation through the aid of the upper layer and lower layer by using a material having a high Ku for the intermediate layer and by using a material having a lower Ku than those of the intermediate layer in upper and lower layers. Also, the inventors of the present invention have found that when no nonmagnetic layer exist between each magnetic layer of a laminate structure of the magnetic layer, the multilayered magnetic layers are not reversed simultaneously but gradually reversed, leading to a deterioration in OW and wide magnetization inverse distribution of the magnetic layer, which is a cause of the turbulence of bit boundaries, resulting in an increase in noise.

SUMMARY OF THE INVENTION

A magnetic recording medium according to the present invention which is completed based on the above teachings adopts the following structure.

(1) A magnetic recording medium comprising a nonmagnetic substrate on which at least a soft magnetic under layer, an orientation adjusting layer that controls the orientation of a layer just thereon, a vertical magnetic layer with an axis of easy magnetization being mainly oriented vertically to the nonmagnetic substrate and a protective layer are disposed, the vertical magnetic layer being constituted of three or more layers including a lower layer, an intermediate layer and an upper layer from the substrate side, wherein the lower, intermediate and upper magnetic layers are constituted of magnetic particles which are columnar crystals extending continuously from the lower layer to the upper layer, the magnetic recording medium further comprising a nonmagnetic layer between the lower and intermediate magnetic layers or between the intermediate and upper magnetic layers, wherein the upper layer has a magnetic anisotropic constant (Ku) ranging from $0.8 \times 10^6$ to $4 \times 10^6$ (erg/cc), the intermediate layer has a magnetic anisotropic constant (Ku) ranging from $2 \times 10^6$ to $7 \times 10^6$ (erg/cc) and the lower layer has a magnetic anisotropic constant (Ku) ranging from $1 \times 10^6$ to $4 \times 10^6$ (erg/cc), and the lower, intermediate and upper magnetic layers are bounded by ferro-coupling.

(2) A magnetic recording medium according to the above (1), wherein the Ku of the above intermediate layer is higher than the Ku of the upper magnetic layer and the Ku of the lower magnetic layer.

(3) A magnetic recording medium according to the above (1) or (2), wherein the Kus of the upper, intermediate and lower magnetic layers have the following relation: Ku of the upper layer<Ku of the lower layer<Ku of the intermediate layer.

(4) A magnetic recording medium according to any one of the above (1) to (3), wherein any one or more of the above lower, intermediate and upper magnetic layers is a magnetic layer having a granular structure in which the surrounding of the columnar magnetic particle is coated with an oxide.

(5) A magnetic recording medium according to any one of the above (1) to (4), wherein the above lower and intermediate magnetic layers are magnetic layers having a granular structure in which the surrounding of the columnar magnetic particle is coated with an oxide and the upper magnetic layer is a magnetic layer containing no oxide.

(6) A magnetic recording medium according to any one of the above (1) to (5), wherein the nonmagnetic layer between the lower and intermediate magnetic layers is a nonmagnetic layer having a granular structure.

(7) A magnetic recording medium according to any one of the above (1) to (6), wherein the product (Ms×t) of the saturation magnetization (Ms) and film thickness (t) of the magnetic layer constituting the intermediate layer is larger than the product (Ms×t) of each magnetic layer constituting the lower and upper magnetic layers.

(8) A magnetic recording medium according to any one of the above (1) to (7), wherein the magnetic recording medium further comprising a nonmagnetic under layer between the orientation adjusting layer and the vertical magnetic layer.

(9) A magnetic recording and reproducing device comprising a magnetic recording medium and a magnetic head that records information in and reproduces the information from the magnetic recording medium, wherein the magnetic recording medium is the magnetic recording medium according to any one of the above (1) to (8).

DETAILED DESCRIPTION OF THE PREFERRED EMBODIMENT

Figure 1:
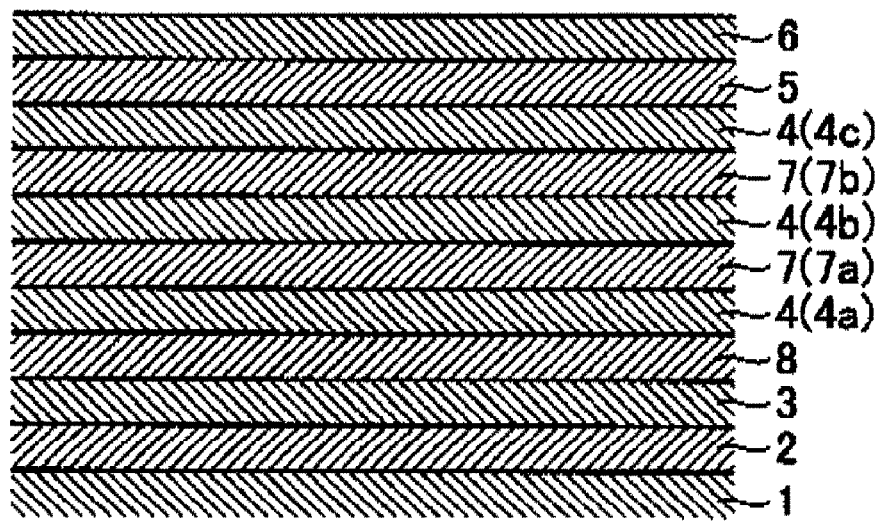
FIG. 1 is a schematic view showing a magnetic recording medium according to the present invention.
Figure 4:
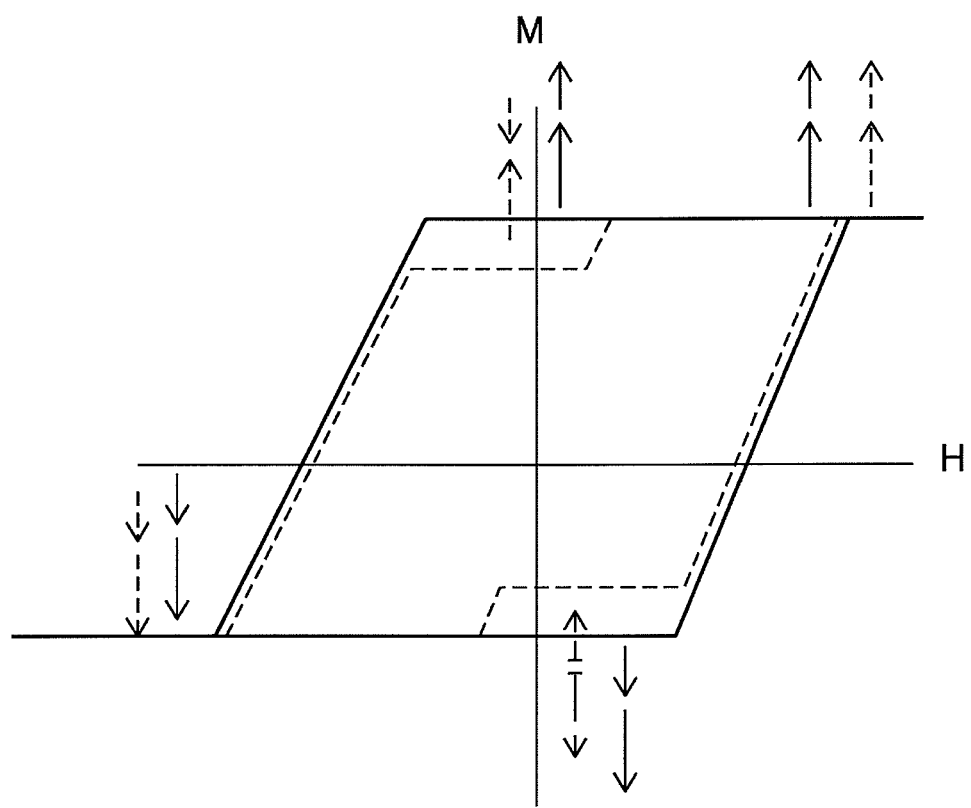
FIG. 4 is a view showing a M-H loop when magnetic layers are bound by AFC.

FIG. 1 is a vertical sectional view showing the structure of an example of a magnetic recording medium in the present invention. The magnetic recording medium shown here has a structure in which a soft magnetic under layer 2, an orientation adjusting layer 3, a vertical magnetic layer 4, a protective layer 5 and a lubricant layer 6 are formed in this order on a nonmagnetic substrate 1. The soft magnetic under layer 2 and the orientation adjusting layer 3 constitute an under layer. Also, the vertical magnetic layer 4 includes three layers consisting of a lower magnetic layer 4a, an intermediate magnetic layer 4b and an upper magnetic layer 4c from the substrate side and contains nonmagnetic layers 7a and 7b between the magnetic layers 4a and 4b or between the magnetic layers 4b and 4c, magnetic particles constituting the magnetic layers 4a, 4b and 4c are columnar crystals extending continuously from the lower layer to the upper layer, and each magnetic layer is bound not by AFC but by ferro-coupling. Because the present invention adopts such a structure, a magnetic recording medium can be provided which has a high S/N ratio, and is superior in heat fluctuation characteristics and in recording characteristics (OW). A difference between AFC and ferro-coupling can be discriminated by a Kerr effect measuring device or a vibration system magnetometer (VSM). A medium bound by AFC shows a specific two-step M-H loop as shown by the dotted line of FIG. 4 because the upper and lower magnetic films are stable in such a magnetic condition that they are magnetized in directions opposite to each other in the situation where the magnetic field is removed after the magnetic field is applied. On the other hand, a medium bound by ferro-coupling shows a M-H loop as shown by the solid line of FIG. 4 because the upper and lower magnetic films are magnetized in the same direction in the situation where the magnetic field is removed after the magnetic field is applied. The arrow shown by the solid line in FIG. 4 shows the direction of magnetization in the case where the upper and lower magnetic films are bound by ferro-coupling, whereas the arrow shown by the dotted line in FIG. 4 shows the direction of magnetization in the case where the upper and lower magnetic films are bound by AFC.

As the nonmagnetic substrate 1, a metal substrate made of a metal material such as aluminum and aluminum alloys may be used, or a nonmetallic substrate made of a nonmetal material such as glass, ceramic, silicon, silicon carbide or carbon may be used.

Examples of the glass substrate include amorphous glass and crystallized glass. As the amorphous glass, general soda lime glass or aluminosilicate glass may be used. Also, as the crystallized glass, lithium type crystallized glass may be used. As the ceramic substrate, a sintered body containing general aluminum oxide, aluminum nitride or silicon nitride as its major component or fiber reinforced materials of these compounds may be used.

As the nonmagnetic substrate 1, a substrate may be used which is obtained by forming a NiP layer or NiP alloy layer on the surface of the above metal substrate or nonmetal substrate by the plating method or sputtering method.

The nonmagnetic substrate 1 has an average surface roughness Ra of 2 nm (20 Å) or less and preferably 1 nm or less from the point that this is suitable for high-density recording made in the condition that the flying height of the head is low.

Also, the microwave (Wa) on the surface is preferably 0.3 nm or less (more preferably 0.25 nm or less) from the point that this is suitable for high-density recording made in the condition that the flying height of the head is low. It is preferable to use a substrate in which the average surface roughness Ra of at least one of the chamfer part and side surface part of the end surface is preferably 10 nm or less (more preferably 9.5 nm or less) from the viewpoint of the flying stability of the magnetic head. The microwave (Wa) can be measured as an average surface roughness in a measuring range of 80 μm by using a surface roughness measuring device (trade name: P-12, manufactured by KLM-Tencor Co. Ltd.).

It is desirable to form an adhesion layer between the substrate 1 and the soft magnetic under layer 2. The contact between the substrate and the soft magnetic under film containing Co or Fe as its major component brings about the possibility of progress of corrosion by the influence of adsorption gas and water on the surface of the substrate or the diffusion of the components of the substrate. The corrosion can be limited by forming the adhesion layer. As the material of the adhesion layer, Cr, Cr alloys, Ti or Ti alloys may be properly selected. The thickness of the adhesion layer is preferably 30 Å or more.

The soft magnetic under layer 2 is formed to increase the component of magnetic fluxes which is perpendicular to the substrate among the magnetic fluxes generated from the magnetic head and also to fix the direction of magnetization of the vertical magnetic layer 4 in which information is recorded to a direction perpendicular to the nonmagnetic substrate 1 more firmly. This action is preferable because it becomes significant when a vertical recording single magnetic pole head is used as the recording and reproducing magnetic head.

The above soft magnetic under layer 2 is made of a soft magnetic material and a material containing Fe, Ni and Co may be used as the material of the soft magnetic under layer 2.

Examples of this material may include CoFe type alloys (for example, CoFeTaZr and CoFeZrNb), FeCo type alloys (for example, FeCo and FeCoV), FeNi type alloys (for example, FeNi, FeNiMo, FeNiCr and FeNiSi), FeAl type alloys (for example, FeAl, FeAlSi, FeAlSiCr, FeAlSiTiRu and FeAlO), FeCr type alloys (for example, FeCr, FeCrTi and FeCrCu), FeTa type alloys (for example, FeTa, FeTaC and FeTaN), FeMg type alloys (for example, FeMgO), FeZr type alloys (for example, FeZrN), FeC type alloys, FeN type alloys, FeSi type alloys, FeP type alloys, FeNb type alloys, FeHf type alloys and FeB type alloys.

Also, materials having a granular structure in which a microcrystalline structure or fine crystal particles of, for example, FeAlO, FeMgO, FeTaN and FeZrN, containing Fe in an amount of 60 at % (atomic %) or more are dispersed in a matrix may be used.

As the material of the soft magnetic under layer 2, besides the above materials, a Co alloy containing 80 at % or more of Co and at least one of Zr, Nb, Ta, Cr and Mo and having an amorphous structure may be used.

Preferable examples of the Co alloy may include CoZr, CoZrNb, CoZrTa, CoZrCr and CoZrMo type alloys.

The coercive force Hc of the soft magnetic under layer 2 is preferably 100 (Oe) or less (more preferably 20 (Oe) or less). Here, 10 e is 79 A/m.

When this coercive force Hc exceeds the above range, only insufficient soft magnetic characteristics are obtained and the regenerative waveform is not made to be the so-called rectangular waveform but made to be a distorted waveform, which is undesirable.

The saturation magnetic flux density Bs of the soft magnetic under layer 2 is preferably 0.6 T or more (more preferably 1 T or more). When this Bs is less than the above range, the regenerative waveform is not made to be the so-called rectangular waveform but made to be a distorted waveform, which is undesirable.

Also, the product Bs·t (T·nm) of the saturation magnetic flux density Bs (T) of the soft magnetic under layer 2 and the layer thickness t (nm) of the soft magnetic under layer 2 is preferably 15 (T·nm) or more (preferably 25 (T·nm) or more). When this Bs·t is less than the above range, the regenerative waveform eventually has a distortion, bring about deteriorated OW (Over Write) characteristics (recording characteristics), which is undesirable.

The soft magnetic under layer 2 is constituted of two soft magnetic films and Ru is preferably formed between the two soft magnetic layers. If the film thickness of Ru is regulated in a specified range from 0.4 to 1.0 nm or from 1.6 to 2.6 nm, the two soft magnetic films resultantly has an AFC structure. The AFC structure enables the spike noise to be limited.

The outermost surface of the soft magnetic under layer 2 (the surface of the layer 2 facing the orientation adjusting layer 3) preferably has a structure in which the material constituting the soft magnetic under layer 2 is partly or perfectly oxidized. It is preferable that, for example, the material constituting the soft magnetic under layer 2 is partly oxidized or an oxide of the above material is formed on the surface (orientation adjusting layer 3 side surface) of the soft magnetic under layer 2 or its vicinity.

This can restrain the magnetic fluctuation of the surface of the soft magnetic under layer 2 and therefore, a noise caused by this magnetic fluctuation can be reduced, making it possible to improve the recording and reproducing characteristics of the magnetic recording medium.

Also, the orientation adjusting layer 3 to be formed on the soft magnetic under layer 2 can be improved in recording and reproducing characteristics by micronizing crystal particles of the vertical magnetic layer. As the material of this orientation adjusting layer 3, those having an hcp structure, fcc structure or amorphous structure are preferable, though no particular limitation is imposed on the material. Particularly, a Ru type alloy, Ni type alloy, Co type alloy, Pt type alloy or Cu type alloy is preferable, or these alloys may be multilayered. It is preferable to adopt, for example, a multilayer structure provided with a Ni type alloy and a Ru type alloy, a Co type alloy and a Ru type alloy, or a Pt type alloy and a Ru type alloy in this order from the substrate side.

For example, in the case of a Ni type alloy, it is preferably made of at least one material selected from a NiW alloy, NiTa alloy, NiNb alloy, NiTi alloy, NiZr alloy, NiMn alloy and NiFe alloy which each contain 33 to 96 at % of Ni. Also, the Ni type alloy may be nonmagnetic materials containing 33 to 96 at % of Ni and one or two or more types of Sc, Y, Ti, Zr, Hf, Nb, Ta and C. In this case, the content of Ni is preferably in a range from 33 at % to 96 at % because the orientation adjusting layer keeps its effect and has no magnetism in this range.

For this, the thickness of the orientation adjusting layer 3 is preferably designed to be 5 to 40 nm (more preferably 8 to 30 nm) as a total thickness in the case of a multilayer in the magnetic recording medium of this embodiment. When the thickness of the orientation adjusting layer 3 is 5 to 40 nm (preferably 8 to 30 nm), the vertical orientation of the vertical magnetic layer 4 is particularly made higher and also, the distance between the magnetic head and the soft magnetic under layer 2 is reduced during the course of recording, thereby making it possible to improve the recording and reproducing characteristics without deteriorating the resolution of regenerative signals.

When this thickness is less than the above range, the vertical orientation in the vertical magnetic layer 4 is deteriorated, so that the recording and reproducing characteristics and heat fluctuation resistance are deteriorated.

Also, this thickness exceeds the above range, the diameter of magnetic particles in the vertical magnetic layer 4 is increased and there is therefore a fear as to deteriorations in noise characteristics, which is undesirable. Also, the distance between the magnetic head and the soft magnetic under layer 2 is increased during the course of recording, which deteriorates the resolution of regenerative signals and reproducing output, which is undesirable.

The surface shape of orientation adjusting layer 3 affects the surface shapes of the vertical magnetic layer 4 and protective layer 5. Therefore, the average surface roughness Ra of the orientation adjusting layer 3 is preferably made to be 2 nm or less to lower the flying height of the magnetic head during the course of recording and reproduction by reducing surface irregularities of the magnetic recording medium.

By reducing this average surface roughness Ra to 2 nm or less, the surface irregularities of the magnetic recording medium can be decreased to thereby sufficiently lower the flying height of the magnetic head during the course of recording and reproduction, enabling high recording density.

Oxygen and nitrogen may be introduced into the gas for forming a film of the orientation adjusting layer 3. If, for example, the sputtering method is used as the film forming method, gas obtained by mixing oxygen in an amount by volume of about 0.05 to 50% (preferably 0.1 to 20%) in argon or gas obtained by mixing nitrogen in an amount by volume of about 0.01 to 20% (preferably 0.02 to 10%) in argon is preferably used as a process gas.

Also, the orientation adjusting layer 3 may have a structure in which metal particles are dispersed in an oxide, metal nitride and metal carbide without any problem. Such a structure is made possible by using an alloy material containing an oxide, metal nitride or metal carbide. $SiO_2$, $Al_2O_3$, $Ta_2O_5$, $Cr_2O_3$, MgO, $Y_2O_3$, $TiO_2$ and the like may be utilized as the oxide. AlN, $Si_3N_4$, TaN, CrN and the like may be used as the metal nitride. TaC, BC, SiC and the like may be utilized as the metal carbide. Examples of the alloy materials may include NiTa—$SiO_2$, RuCo—$Ta_2O_5$, Ru—$SiO_2$, Pt—$Si_3N_4$ and Pd—TaC.

The content of the oxide, metal nitride and metal carbide in the orientation adjusting layer 3 is preferably 1 mol % or more and 12 mol % or less based on the alloy. When the content of the oxide, metal nitride and metal carbide in the orientation adjusting layer 3 exceeds the above range, this case is undesirable because the oxide, metal nitride and metal carbide remain in the metal particles, and there is therefore a fear that the crystallinity and orientation of the metal particles are impaired and also that the crystallinity and orientation of the magnetic layer formed on the orientation adjusting layer 3 are impaired. When the content of the oxide, metal nitride and metal carbide in the orientation adjusting layer 3 is less than the above range, it is undesirable because the effect obtained by the addition of the oxide, metal nitride and metal carbide is not obtained.

A nonmagnetic under layer 8 is preferably formed between the orientation adjusting layer 3 and the vertical magnetic layer 4. A turbulence of crystal growth is easily caused in the initially formed part of the vertical magnetic layer 4 just above the orientation adjusting layer 3 and is a cause of a noise. This initially formed turbulent part is replaced with the nonmagnetic under layer 8, thereby making possible to restrain the generation of a noise.

The nonmagnetic under layer 8 is made of a material containing Co as its major component and further, an oxide 41. This oxides 41 is preferably an oxide of Cr, Si, Ta, Al, Ti, Mg or Co. Particularly, $TiO_2$, $Cr_2O_3$ and $SiO_2$ are preferable. It is preferable to use a composite oxide obtained by combining two or more oxides. Particularly, $Cr_2O_3+SiO_2$, $Cr_2O_3+TiO_2$ and $Cr_2O_3+SiO_2+TiO_2$ are preferable.

The nonmagnetic under layer 8 is preferably made of CoCr—$SiO_2$, CoCr—$TiO_2$, CoCr—$Cr_2O_3$—$SiO_2$, CoCr—$TiO_2$—$Cr_2O_3$ or CoCr—$Cr_2O_3$—$TiO_2$—$SiO_2$ and Pt may be formulated from the viewpoint of crystal growth. The amount of Cr is preferably 25 at % (atomic %) or more and 50 at % or less. The content of the oxide is preferably 3 mol % or more and 18 mol % or less based on the total mol calculated when the alloy of Co, Cr, Pt and the like constituting the magnetic particles is assumed as one compound.

The thickness of the nonmagnetic under layer 8 is preferably 0.2 nm or more and 3 nm or less. When the thickness exceeds 3 nm, it is undesirable because Hc and Hn are dropped.

The magnetic layer 4a contains Co as its major component and a material containing the oxide 41. This oxide 41 is preferably an oxide of Cr, Si, Ta, Al, Ti, Mg or Co. Particularly, $TiO_2$, $Cr_2O_3$ and $SiO_2$ are preferable. Composite oxides obtained by combining two or more oxides are preferable. Particularly, $Cr_2O_3+SiO_2$, $Cr_2O_3+TiO_2$, $Cr_2O_3+SiO_2+TiO_2$ are preferable.

Figure 2:
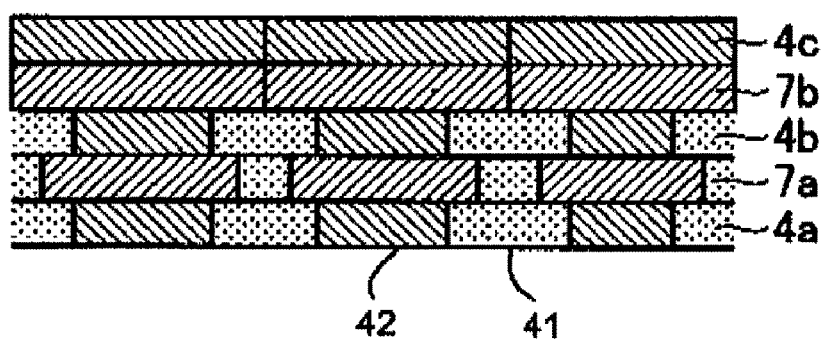
FIG. 2 is a schematic view showing the structures of a magnetic layer and a nonmagnetic layer according to the present invention.

The magnetic layer 4a preferably has a structure in which magnetic particles 42 (crystal particles having magnetism) are dispersed in the layer. These magnetic particles 42 preferably have a columnar structure penetrating vertically through the magnetic layers 4a, 4b and 4c as shown in FIG. 2. The formation of such a structure ensures that the orientation and crystallinity of the magnetic particles 42 of the magnetic layer 4 can be improved, with the result that a signal/noise ratio (S/N ratio) suitable for high-density recording can be obtained.

In order to obtain such a structure, the amount of the oxide 41 to be contained and the film forming condition of the magnetic layer are important.

The content of the oxide 41 is preferably 3 mol % or more and 18 mol % or less based on the total mol calculated when the alloy of Co, Cr, Pt and the like constituting the magnetic particles 42 is assumed as one compound. The content of the oxide 41 is more preferably 6 mol % or more and 13 mol % or less.

The reason why the above range is preferable as the content of the oxide in the magnetic layer 4a is that the oxide precipitates around the magnetic particles to allow the magnetic particles 42 to be isolated and micronized when the layer is formed (FIG. 2). When the content of the oxide exceeds the above range, it is undesirable because the oxide remains in the magnetic particles, impairing the orientation and crystallinity of the magnetic particles, and also, the oxide precipitates on the top and bottom of the magnetic particle, with the result that the columnar structure in which the magnetic particles penetrate vertically through the magnetic layers is not formed. When the content of the oxide is less than the above range, on the other hand, this is undesirable because the magnetic particles are insufficiently separated and micronized, with the result that a noise during the course of recording and reproduction is increased and therefore, a signal/noise ratio (S/N ratio) suitable for high-density recording is not obtained.

The content of Cr in the magnetic layer 4a is preferably 4 at % or more and 19 at % or less (more preferably 6 at % or more and 17 at % or less). The reason why the content of Cr is in the above range is that the magnetic anisotropic constant Ku of the magnetic particles is not reduced too much and also, high magnetization is maintained, with the result that recording and reproducing characteristics suitable for high-density recording and sufficient heat fluctuation characteristics are obtained.

When the content of Cr exceeds the above range, the magnetic anisotropic constant Ku of the magnetic particles is reduced. Therefore, the heat fluctuation characteristics are deteriorated and the crystallinity and orientation of the magnetic particles are impaired, with the result that the recording and reproducing characteristics are deteriorated. Therefore, a Cr content exceeding the above range is undesirable. Also, the content of Cr is less than the above range, it is undesirable because the magnetic anisotropic constant Ku of the magnetic particles is higher, and therefore, the vertical coercive force is made too high. Therefore, when data is recorded, satisfactory writing cannot be attained using the head, with the result that recording characteristics (OW) unsuitable for high-density recording are obtained, which is undesirable.

The content of Pt in the magnetic layer 4a is preferably 8 at % or more and 20 at % or less. The reason why the content of Pt is in the above range is that when the content of Pt is less than 8 at %, the magnetic anisotropic constant Ku required for the vertical magnetic layer is lowered, which is undesirable. When the content of Pt exceeds 20 at %, stacking faults arise inside of the magnetic particles, with the result that the magnetic anisotropic constant Ku is reduced, which is undesirable. The above content of Pt is preferable because the heat fluctuation characteristics and recording and reproducing characteristics suitable for high-density recording are obtained.

When the content of Pt exceeds the above range, a layer having a fcc structure is formed in the magnetic particles and there is therefore a fear that the crystallinity and orientation are impaired, which is undesirable. Also, when the content of Pt is less than the above range, this is undesirable because the magnetic anisotropic constant Ku enough to obtain heat fluctuation characteristics suitable for high-density recording is not obtained.

The magnetic layer 4a may contain one or more elements selected from B, Ta, Mo, Cu, Nd, W, Nb, Sm, Tb, Ru and Re besides Co, Cr, Pt and oxides. Micronization of the magnetic particles can be promoted or crystallinity and orientation can be improved by containing the above elements, making it possible to obtain the recording and reproducing characteristics and heat fluctuation characteristics suitable for higher-density recording.

The total content of the above elements is preferably 8 at % or less. When the content exceeds 8 at %, it is undesirable because phases other than a hcp phase are formed in the magnetic particles and therefore, the crystallinity and orientation of the magnetic particles are disturbed, with the result that the recording and reproducing characteristics and heat fluctuation characteristics suitable for high-density recording are not obtained.

The Ku of the magnetic layer 4a is preferably in a range from $1 \times 10^6$ to $4 \times 10^6$ (erg/cc). When the value of Ku is less than the above range, it is undesirable because this results in easy occurrence of a magnetization inversion, giving rise to problems concerning a reduction in Hn and a deterioration in heat fluctuation characteristics. When the value of Ku exceeds the above range, it is difficult to easily undergo a magnetization inversion against the magnetic field of the head, so that it is difficult to assist the magnetization inversion of the magnetic layer 4b disposed on the magnetic layer 4a, with the result that a reduction in OW characteristics and a drop in SNR caused by a deterioration in ΔSw (Distribution of a magnetization inversion) are observed, which is undesirable.

The magnetic layer 4a preferably has a lower Ku than the one that the magnetic layer 4b has. Specifically, it is necessary that the magnetic layer 4a has a lower Ku than the magnetic layer 4b to make easy to undergo a magnetization inversion because the magnetic layer 4a is placed at a longer distance from the head than the head magnetic layer 4b. However, when a material having a too low Ku is used, there is a fear that the magnetization inversion occurs more easily than required, which affects the heat fluctuation, leading to lower Hc and Hn. Therefore, the value of Ku is preferably designed to be in the above range.

Examples of the material suitable for the magnetic layer 4a may include $(Co14Cr18Pt)90-(SiO_2)10$ {magnetic particles containing Cr (14 at %) and Pt (18 at %) which is balanced with Co: 90 mol % when these magnetic particles are regarded as one compound, and a composition of an oxide constituted of $SiO_2$: 10 mol %}, $(Co10Cr16Pt)92-(SiO_2)8$, $(Co8Cr14Pt4Nb)94-(Cr_2O_3)6$, $(CoCrPt)—(Ta_2O_5)$, $(CoCrPt)—(Cr_2O_3)—(TiO_2)$, $(CoCrPt)—(Cr_2O_3)—(SiO_2)$, $(CoCrPt)—(Cr_2O_3)—(SiO_2)—(TiO_2)$, $(CoCrPtMo)—(TiO)$, $(CoCrPtW)—(TiO_2)$, $(CoCrPtB)—(Al_2O_3)$, $(CoCrPtTaNd)—(MgO)$, $(CoCrPtBCu)—(Y_2O_3)$ and $(CoCrPtRu)—(SiO_2)$.

The magnetic layer 4b is made of a material containing Co as its major component and the oxide 41. This oxide 41 is preferably an oxide of Cr, Si, Ta, Al, Ti, Mg or Co. Particularly, $TiO_2$, $Cr_2O_3$ and $SiO_2$ are preferable. Composite oxides obtained by combining two or more oxides are preferable. Particularly, $Cr_2O_3+SiO_2$, $Cr_2O_3+TiO_2$ and $Cr_2O_3+SiO_2+TiO_2$ are preferable.

The magnetic layer 4b preferably has a structure in which magnetic particles (crystal particles having magnetism) 42 are dispersed in the layer. These magnetic particles 42 preferably have a columnar structure penetrating vertically through the magnetic layers 4a, 4b and 4c as shown in FIG. 2. The formation of such a structure ensures that the orientation and crystallinity of the magnetic particles 42 of the magnetic layer 4 can be improved, with the result that a signal/noise ratio (S/N ratio) suitable for high-density recording can be obtained.

The content of the oxide of the magnetic layer 4b is preferably 3 mol % or more and 18 mol % or less based on the total amount of compounds of Co, Cr, Pt and the like constituting the magnetic particles. The content of the oxide is more preferably 6 mol % or more and 13 mol % or less.

The reason why the above range is preferable as the content of the oxide in the magnetic layer 4b is that the oxide precipitates around the magnetic particles to allow the magnetic particles 42 to be isolated and micronized when the layer is formed (FIG. 2). When the content of the oxide exceeds the above range, it is undesirable because the oxide remains in the magnetic particles, impairing the orientation and crystallinity of the magnetic particles, and also, the oxide precipitates on the top and bottom of the magnetic particle, with the result that the columnar structure in which the magnetic particles penetrate vertically through the magnetic layers is not formed. When the content of the oxide is less than the above range, on the other hand, this is undesirable because the magnetic particles are insufficiently separated and micronized, with the result that a noise during the course of recording and reproduction is increased and therefore, a signal/noise ratio (S/N ratio) suitable for high-density recording is not obtained.

The content of Cr in the magnetic layer 4b is preferably 4 at % or more and 18 at % or less (more preferably 8 at % or more and 15 at % or less). The reason why the content of Cr is in the above range is that this range is preferable because the magnetic anisotropic constant Ku of the magnetic particles is not too decreased and also, high magnetization is kept, with the result that recording and reproducing characteristics suitable for high-density recording and sufficient heat fluctuation characteristics are obtained.

When the content of Cr exceeds the above range, it is undesirable because the magnetic anisotropic constant Ku of the magnetic particles is decreased, so that the heat fluctuation characteristics are deteriorated and also, the crystallinity and orientation of the magnetic particles are impaired, resulting in deteriorated recording and reproducing characteristics. When the content of Cr is less than the above range, on the other hand, this is also undesirable because the magnetic anisotropic constant Ku of the magnetic particles is high, and therefore, the vertical coercive force becomes too large, so that information can be insufficiently written in the medium by the head when data is recorded, with the result that recording characteristics (OW) unsuitable for high-density recording are obtained.

The content of Pt in the magnetic layer 4b is preferably 10 at % or more and 22 at % or less. The reason why the content of Pt is in the above range is that when the content of Pt is less than 10 at %, this is undesirable because the magnetic anisotropic constant Ku required for the vertical magnetic layer is low. When the content of Pt exceeds 22 at % on the other hand, this is undesirable because stacking faults arise inside of the magnetic particle, with the result that the magnetic anisotropic constant Ku is low. The above range of the content of Pt is desirable to obtain heat fluctuation characteristic and recording and reproducing characteristics suitable for high-density recording.

When the content of Pt exceeds the above range, this is undesirable because a layer having an fcc structure is formed in the magnetic particles and there is therefore a fear that the crystallinity and orientation are impaired. When the content of Pt is less than the above range, on the other hand, this is undesirable because a magnetic anisotropic constant Ku for obtaining heat fluctuation characteristics suitable for high-density recording is not obtained.

The magnetic layer 4b may include one or more elements selected from B, Ta, Mo, Cu, Nd, W, Nb, Sm, Tb, Ru and Re besides Co, Cr, Pt and an oxide. When the above elements are contained, the micronization of the magnetic particles is promoted and the crystallinity and orientation can be improved, with the result that recording and reproducing characteristics and heat fluctuation characteristics suitable for higher-recording density can be obtained.

The total content of the above elements is preferably 8 at % or less. When the content exceeds 8 at %, this is undesirable because phases other than the hcp phase are formed in the magnetic particle, so that the crystallinity and orientation of the magnetic particles are disturbed, with the result that the recording and reproducing characteristics and heat fluctuation characteristics suitable for high-density recording are not obtained.

The Ku of the magnetic layer 4b is preferably in a range from $2 \times 10^6$ to $7 \times 10^6$. When the value of Ku is less than the above range, this is undesirable because the magnetization inversion easily occurs, giving rise to problems concerning a reduction in Hn and a deterioration in heat fluctuation characteristics. When the value of Ku exceeds the above range, on the other hand, this is undesirable because it is difficult to easily undergo a magnetization inversion against the magnetic field of the head, and a reduction in OW characteristics and a drop in SNR caused by the deterioration in ΔSw (Distribution of a magnetization inversion) are observed.

The magnetic layer 4b preferably has a higher Ku than the one that the magnetic layer 4a has. However, in the case of using a material having a too high Ku, a magnetization inversion is made difficult even if the assistance of the magnetic layer 4a is secured, and therefore there is a fear concerning a low OW. This is the reason why the value of Ku of the magnetic layer 4b is preferably designed to be in the above range.

The magnetic layer 4c is preferably made of a material containing Co as its major component and no oxide and preferably has a structure in which, as shown in FIG. 2, the magnetic particles 42 in the layer is epitaxially grown to be columnar from the magnetic particles 42 in the magnetic layer 4a. In this case, the magnetic particles of the magnetic layers 4a, 4b and 4c are preferably epitaxially grown to be columnar one-on-one from each magnetic layer to other magnetic layer.

Since the magnetic particles 42 of the magnetic layer 4b are grown from the magnetic particles 42 in the magnetic layer 4a by epitaxial growth, the magnetic particles 42 of the magnetic layer 4b are micronized and the crystallinity and orientation are more improved, which is desirable.

The content of Cr in the magnetic layer 4c is preferably 10 at % or more and 24 at % or less. The limitation of the content of Cr to the above range is preferable because the output when reproducing data can be sufficiently secured and good heat fluctuation characteristics are obtained.

When the content of Cr exceeds the above range, this is undesirable because the magnetic layer 4c is magnetized a too little. When the content of Cr is less than the above range, on the other hand, the magnetic particles are insufficiently separated and micronized, leading to an increase in noise during the course of recording and reproduction, so that a signal/noise ratio (S/N ratio) suitable for high-density recording cannot be obtained, which is undesirable.

Also, the magnetic layer 4c may be made of a material containing Pt besides Co and Cr. The content of Pt in the magnetic layer 4c is preferably 8 at % or more and 20 at % or less. The reason why the content of Pt is in the above range is that sufficient coercive force suitable for high-density recording is obtained and high reproducing output during the course of recording and reproduction can be maintained, with the result that recording and reproducing characteristics and heat fluctuation characteristics suitable for high-density recording are obtained.

When the content of Pt exceeds the above range, a phase having a fcc structure is formed in the magnetic layer and there is therefore a fear that the crystallinity and orientation are impaired, which is undesirable. When the content of Pt is less than the above range, on the other hand, a magnetic anisotropic constant Ku enough to obtain heat fluctuation characteristics suitable for high-density recording is not obtained, which is also undesirable.

The magnetic layer 4c may include one or more elements selected from B, Ta, Mo, Cu, Nd, W, Nb, Sm, Tb, Ru, Re and Mn besides Co, Cr and Pt. When the above elements are contained, the micronization of the magnetic particles is promoted or the crystallinity and orientation can be improved, with the result that recording and reproducing characteristics and heat fluctuation characteristics suitable for higher-recording density can be obtained.

The total content of the above elements is preferably 16 at % or less. When the content exceeds 16 at %, this is undesirable because phases other than the hcp phase are formed in the magnetic particle, so that the crystallinity and orientation of the magnetic particles are disturbed, with the result that the recording and reproducing characteristics and heat fluctuation characteristics suitable for high-density recording are not obtained.

Examples of the material suitable for the magnetic layer 4c may include a CoCrPt type and CoCrPtB type. In the case of CoCrPtB type, the total content of Cr and B is preferably 18 at % or more and 28 at % or less.

Examples of the materials suitable for the magnetic layer 4c may preferably include Co14-24Cr8-22Pt{content of Cr: 14 to 24 at %, content of Pt: 8 to 22 at %, balanced with Co} in the case of CoCrPt type and Co10-24Cr8-22Pt0-16B{content of Cr: 10 to 24 at %, content of Pt: 8 to 22 at %, content of B: 0 to 16 at %, balanced with Co} in the case of CoCrPtB type. Examples of other types may include Co10-24Cr8-22Pt1-5Ta{content of Cr: 10 to 24 at %, content of Pt: 8 to 22 at %, content of Ta: 1 to 5 at %, balanced with Co} in the case of CoCrPtTa type and Co10-24Cr8-22Pt1-5Ta1-10B{content of Cr: 10 to 24 at %, content of Pt: 8 to 22 at %, content of Ta: 1 to 5 at %, content of B: 1 to 10 at %, balanced with Co} in the case of CoCrPtTaB type. Also, examples of further types may include a CoCrPtBNd type, CoCrPtTaNd type, CoCrPtNb type, CoCrPtBW type, CoCrPtMo type, CoCrPtCuRu type and CoCrPtRe type.

The Ku of the magnetic layer 4c is preferably in a range from $1 \times 10^6$ to $5 \times 10^6$. When the value of Ku is less than the above range, it is undesirable because a magnetization inversion is easily caused, posing problems concerning a reduction in Hn and a deterioration in heat fluctuation characteristics. When the value of Ku exceeds the above range, on the other hand, this is undesirable because it is difficult to easily undergo a magnetization inversion against the magnetic field of the head, and a reduction in OW characteristics and a drop in SNR caused by the deterioration in ΔSw (Distribution of a magnetization inversion) are observed.

The magnetic layer 4b preferably has a higher Ku than the magnetic layers 4a and 4c. It is more preferable that the Kus of the upper, intermediate and lower magnetic layers satisfy the following relation: Ku of the upper layer<Ku of the lower layer<Ku of the intermediate layer. When such a relation is established between the Kus of these layers, the magnetic layer is allowed to undergo a magnetization inversion with ease. However, in the case of using a material having a too high Ku, a magnetization inversion is made difficult even if the assistance of the magnetic layer 4a is secured, and therefore there is a fear concerning a low OW. This is the reason why the value of Ku of the magnetic layer 4b is preferably designed to be in the above range.

The vertical coercive force (Hc) of the vertical magnetic layer 4 is preferably 3000 [Oe] or more. When the coercive force is less than 3000 [Oe], the recording and reproducing characteristics and especially, frequency characteristics are inferior and also, the heat fluctuation characteristics are deteriorated. Therefore, such a low coercive force is undesirable for a high-density recording medium.

The reversed domain nucleation magnetic field (−Hn) of the vertical magnetic layer 4 is preferably 1500 [Oe] or more. When the reversed domain nucleation magnetic field (−Hn) is less than 1500 [Oe], this is undesirable because the heat fluctuation resistance is deteriorated.

In the vertical magnetic layer 4, the average particle diameter of the magnetic particles is preferably 3 to 12 nm. This average particle diameter can be determined, for example, by observing the vertical magnetic layer 4 by using a TEM (transmission type electron microscope) and by treating the observed image by using image processing.

The thickness of the vertical magnetic layer 4 is preferably designed to be 5 to 20 nm. When the thickness of the vertical magnetic layer 4 is less than the above range, only insufficient reproducing output is obtained and also, the heat fluctuation characteristics are deteriorated. When the thickness of the vertical magnetic layer 4 exceeds the above range, on the other hand, it is undesirable because the magnetic particles in the vertical magnetic layer 4 are thickened, leading to an increase in noise at recording and reproducing times, with the result that the recording and reproducing characteristics represented by signal/noise ratio (S/N ratio) and recording characteristics (OW) are impaired.

The protective layer 5 serves to prevent the vertical magnetic layer 4 from being corroded and also serves to prevent damages to the surface of the medium when the magnetic head is in contact with the medium. As the material, conventionally known materials may be used and, for example, materials containing C, $SiO_2$ or $ZrO_2$ may be used.

The thickness of the protective layer 5 is preferably designed to be 1 to 10 nm in view of high-density recording because the distance between the head and the medium can be made small.

As the lubricant layer 6, lubricants such as a perfluoropolyether, fluorinated alcohol and fluorinated carboxylic acid are preferably used.

In the present invention, the vertical magnetic layer 4 may be constituted of four or more magnetic layers. For example, the vertical magnetic layer 4 may have a structure in which besides the magnetic layers 4a and 4b, a magnetic layer having a granular structure consists of three layers and the magnetic layer 4c having no oxide is formed on the magnetic layer having a granular structure, or the magnetic layer 4c containing no oxide consists of a two-layer structure and formed on the magnetic layers 4a and 4b. In the magnetic recording medium of the present invention, it is preferable that the magnetic layer on the substrate side is made of a magnetic layer having a granular structure and the magnetic layer on the protective layer side is made of a magnetic layer having a non-granular structure having no oxide. Such a structure enables easy control and adjustment of each of the characteristics of the magnetic recording medium such as heat fluctuation characteristics, recording characteristics (OW) and S/N ratio.

In the present invention, a nonmagnetic layer 7 (reference numerals 7a and 7b in FIG. 1) is preferably disposed between three or more magnetic layers constituting the vertical magnetic layer 4. The nonmagnetic layer 7 is designed to have an appropriate thickness, thereby a magnetization inversion of a respective layer is made easy and the dispersion of a magnetization inversion of the whole magnetic particles can be made small. As a result, the S/N ratio can be more improved.

As the nonmagnetic layer 7 disposed between the magnetic layers constituting the vertical magnetic layer 4, it is preferable to use a material having a hcp structure. It is preferable to use Ru, Ru alloys, CoCr alloys or CoCrX1 alloys (X1: one or two or more types selected from Pt, Ta, Zr, Re, Ru, Cu, Nb, Ni, Mn, Ge, Si, O, N, W, Mo, Ti, V, Zr and B).

When a CoCr type alloy is used as the nonmagnetic layer 7 disposed between the magnetic layers constituting the vertical magnetic layer 4, the content of Co is preferably in a range from 30 to 80 at %. This is because when the content of Co is in this range, the coupling between the magnetic layers can be adjusted to a small level.

Also, in the nonmagnetic layer 7 disposed between the magnetic layers constituting the vertical magnetic layer 4, for example, alloys of Ru, Re, Ti, Y, Hf or Zn besides Ru may be used as the alloy having a hcp structure.

In the nonmagnetic layer 7 disposed between the magnetic layers constituting the vertical magnetic layer 4, metals or alloys having other structures may be used to the extent that the crystallinity and orientation of magnetic layers disposed above or below the nonmagnetic layer 7 are not impaired. Examples of these metals and alloys include elements and alloys of elements such as Pd, Pt, Cu, Ag, Au, Ir, Mo, W, Ta, Nb, V, Bi, Sn, Si, Al, C, B and Cr. Particularly, it is preferable to use CrX2 (X2: one or two or more types selected from Ti, W, Mo, Nb, Ta, Si, Al, B, C and Zr) as the Cr alloy. In this case, the content of Cr is preferably 60 at % or more.

Also, as the nonmagnetic layer 7 disposed between the magnetic layers constituting the vertical magnetic layer 4, the nonmagnetic layer 7 preferably has a structure in which metal particles of the above alloy are dispersed in an oxide, metal nitride or metal carbide. Moreover, the metal particles more preferably have a columnar structure which penetrates vertically through the nonmagnetic layer 7. In order to obtain such a structure, an alloy material containing an oxide may be used. As the oxide, $SiO_2$, $Al_2O_3$, $Ta_2O_5$, $Cr_2O_3$, MgO, $Y_2O_3$, $TiO_2$ and the like may be used. As the metal nitride, AlN, $Si_3N_4$, TaN, CrN and the like may be used. As the metal carbide, TaC, BC, SiC and the like may be used. Examples of the material of the nonmagnetic layer 7 may include CoCr—$SiO_2$, CoCr—$TiO_2$, CoCr—$Cr_2O_3$, CoCrPt—$Ta_2O_5$, Ru—$SiO_2$, Ru—$Si_3N_4$ and Pd—TaC.

The oxide, metal nitride and metal carbide in the nonmagnetic layer 7 disposed between the magnetic layers constituting the vertical magnetic layer 4 are preferably contained to the extent that the crystal growth and crystal orientation of the vertical magnetic film are not impaired. The content of the oxide, metal nitride and metal carbide is preferably 4 mol % or more and 30 mol % or less based on the alloy. When the content of the oxide, metal nitride and metal carbide in the nonmagnetic layer 7 exceeds the above range, the oxide, metal nitride and metal carbide remain in the metal particles and impair the crystallinity and orientation of the metal particles. Also, the oxide, metal nitride and metal carbide resultantly precipitate on the top and bottom of the metal particle and therefore, the metal particles scarcely form a columnar structure which vertically penetrates through the nonmagnetic layer 7, arousing a fear that the crystallinity and orientation of the magnetic layer formed on the nonmagnetic layer 7 are impaired, which is undesirable. When the content of the oxide, metal nitride and metal carbide contained in the nonmagnetic layer 7 is less than the above range, it is undesirable because the effect obtained by the addition of the oxide, metal nitride and metal carbide is not obtained.

The thickness of the nonmagnetic layer 7 is preferably in such a range as not to completely cut the magnetostatic coupling of each layer constituting the vertical magnetic layer 4. When three or more magnetic layers according to the present invention are bound by FC coupling and the magnetostatic coupling is completely cut, the M-H loop is changed to a loop reversing in two steps and therefore, this can be easily discriminated. When this two-stage loop arises, this means that the magnetic grains are not simultaneously reversed to the magnetic field from the head, resulting in a significant deterioration in S/N ratio during reproducing and a reduction in resolution, which is undesirable. The thickness of the nonmagnetic layer 7 is preferably designed to be 0.1 nm or more and 2 nm or less (more preferably 0.1 or more and 0.8 nm or less). However, when Ru or an Ru alloy is used, AFC arises when the thickness is in a range from 0.6 nm or more and 1.2 nm or less. In this invention, it is essential that each magnetic layer is bound not by AFC but by FC-magnetostatic coupling.

Next, an example (structure of FIG. 1) of a method of producing a magnetic recording medium having the above structure will be explained.

In the case of producing a magnetic recording medium having the above structure, the soft magnetic under layer 2, the orientation adjusting layer 3 and the vertical magnetic layer 4 are formed in this order on the nonmagnetic substrate 1 by, for example, the sputtering method, vapor deposition method or ion plating method. Then, the protective layer 5 is formed by, preferably, the plasma CVD method, ion beam method or sputtering method.

As the nonmagnetic substrate 1, a metal substrate made of a metal material such as aluminum or an aluminum alloy or a nonmetal substrate made of a nonmetal material such as glass, ceramic, silicon, silicon carbide or carbon may be used.

Examples of the glass substrate include amorphous glass and crystallized glass. General soda lime glass and aluminosilicate glass may be used as the amorphous glass and lithium type crystallized glass may be used as the crystallized glass. As the ceramic substrate, sintered bodies using general aluminum oxide, aluminum nitride and silicon nitride as its major component or fiber-reinforced materials of these materials may be used.

A substrate obtained by forming a NiP layer on the surface of the above metal or nonmetal substrate by using the plating method or sputtering method may be used as the nonmagnetic substrate 1.

The nonmagnetic substrate preferably has an average surface roughness Ra of 1 nm (10 Å) or less and preferably 0.6 nm or less from the point of adaptability to high-density recording using a head at a low-flying height.

Also, the microwave (Wa) on the surface is preferably 0.3 nm or less (more preferably 0.25 nm or less) from the point that it is suitable for high-density recording using a head at a low-flying height. It is preferable to use a substrate in which the average surface roughness Ra of at least one of the chamfer part and side surface part of the end surface is 10 nm or less (more preferably 9.5 nm or less) from the viewpoint of the flying stability of the magnetic head. The microwave (Wa) can be measured as an average surface roughness in a measuring range of 80 μm by using a surface roughness measuring device (trade name: P-12, manufactured by KLM-Tencor Co. Ltd.).

The nonmagnetic substrate 1 is washed according to the need and this nonmagnetic substrate 1 is placed in a chamber of a film formation apparatus.

The soft magnetic under layer 2, orientation adjusting layer 3 and vertical magnetic layer 4 are formed on the nonmagnetic substrate 1 by the DC or RF magnetron sputtering method using each sputtering target containing a material having the same composition of each layer as a raw material. The condition of the sputtering for forming the layers is determined as follows. The chamber used for forming the layer is evacuated until the degree of vacuum reaches $10^{-4}$ to $10^{-7}$ Pa. The nonmagnetic substrate is put in the chamber and Ar gas is introduced into the chamber as the sputtering gas to be discharged, thereby forming a film by sputtering. At this time, the power to be supplied is 0.1 to 2 kW, and the discharge time and the power to be supplied can be adjusted to obtain a desired film thickness.

It is preferable to form the soft magnetic under layer 2 having a film thickness of 15 to 100 nm by adjusting the discharge time and the power to be supplied.

When the soft magnetic under layer 2 is formed, it is preferable to use a sputtering target made of a soft magnetic material because the soft magnetic under layer 2 can be easily formed. Examples of the soft magnetic material may include CoFe alloys (for example, CoFeTaZr and CoFeZrNb), FeCo type alloys (for example, FeCo and FeCoV), FeNi type alloys (for example, FeNi, FeNiMo, FeNiCr and FeNiSi), FeAl type alloys (for example, FeAl, FeAlSi, FeAlSiCr, FeAlSiTiRu and FeAlO), FeCr type alloys (for example, FeCr, FeCrTi and FeCrCu), FeTa type alloys (for example, FeTa, FeTaC and FeTaN), FeMg type alloys (for example, FeMgO), FeZr type alloys (for example, FeZrN), FeC type alloys, FeN type alloys, FeSi type alloys, FeP type alloys, FeNb type alloys, FeHf type alloys, FeB type alloys, and FeAlO, FeMgO, FeTaN and FeZrN containing 60 at % or more of Fe. Also, preferable examples of the soft magnetic material may include CoZr, CoZrNb, CoZrTa, CoZrCr and CoZrMo type alloys which each contain 80 at % or more of Co and at least one of Zr, Nb, Ta, Cr and Mo and have an amorphous structure.

The above target is an alloy target produced by the melting method or a sintered alloy target.

After the soft magnetic under layer 2 is formed, the orientation adjusting layer 3 is formed in a thickness of 5 to 40 nm (preferably, 8 to 30 nm) by adjusting the discharge time and power to be supplied. Examples of the sputtering target material to be used for forming the orientation adjusting layer 3 may include Ru type alloys, Ni type alloys and Co type alloys.

Next, the vertical magnetic layer 4 is formed.

First, the magnetic layers 4a and 4b containing oxides are formed by the sputtering method using a sputtering target in the same manner. Examples of the sputtering target may include (Co14Cr18Pt)90-(SiO$_2$)10{90 mol % of a magnetic alloy having a composition containing Cr (14 at %) and Pt (18 at %), balanced with Co and 10 mol % of an oxide composition consisting of SiO$_2$}, (Co10Cr16Pt)92-(SiO$_2$)8{92 mol % of a magnetic alloy having a composition containing Cr (10 at %) and Pt (16 at %), balanced with Co and 8 mol % of an oxide composition consisting of SiO$_2$}, (Co8Cr14Pt4Nb)94-(Cr$_2$O$_3$)6{94 mol % of a magnetic alloy having a composition containing Cr (8 at %), Pt (14 at %) and Nb (4 at %), balanced with Co and 6 mol % of an oxide composition consisting of Cr$_2$O$_3$}, and besides, (CoCrPt)—(Ta$_2$O$_5$), (CoCrPt)—(Cr$_2$O$_3$)—(TiO$_2$), (CoCrPt)—(Cr$_2$O$_3$)—(SiO$_2$), (CoCrPt)—(Cr$_2$O$_3$)—(SiO$_2$)—(TiO$_2$), (CoCrPtMo)—(TiO), (CoCrPtW)—(TiO$_2$), (CoCrPtB)—(Al$_2$O$_3$), (CoCrPtTaNd)—(MgO), (CoCrPtBCu)—(Y$_2$O$_3$) and (CoCrPtRu)—(SiO$_2$).

The content of the oxide is preferably 3 mol % or more and 18 mol % or less based on the total mol of compositions of Co, Cr and Pt. The content of the oxide is more preferably 6 mol % or more and 13 mol % or less.

The reason why the above range is preferable as the content of the oxide in the magnetic layers 4a and 4b is that the oxide precipitates around the magnetic particles to allow the magnetic particles to be isolated and micronized when the layer is formed. When the content of the oxide exceeds the above range, it is undesirable because the oxide remains in the magnetic particles, impairing the orientation and crystallinity of the magnetic particles, and also, the oxide precipitates on the top and bottom of the magnetic particle, with the result that the columnar structure (structure shown in FIG. 2) in which the magnetic particles penetrate vertically through the magnetic layers is not formed. When the content of the oxide is less than the above range, on the other hand, this is undesirable because the magnetic particles are insufficiently separated and micronized, with the result that a noise during the course of recording and reproduction is increased and therefore, a signal/noise ratio (S/N ratio) suitable for high-density recording is not obtained.

The magnetic layers 4a and 4b each preferably have a structure in which the magnetic particles 42 are dispersed in the layer as shown in FIG. 2. Also, a columnar structure (structure of FIG. 2) in which the magnetic particles 42 penetrates vertically through the magnetic layer 4 is preferable. The formation of such a structure requires, besides the use of a target material as described above, the following condition. In FIG. 2, the magnetic particles 42 of the magnetic layer 4a form a columnar structure in combination with the nonmagnetic particles of the nonmagnetic layer 7a and these nonmagnetic particles form a columnar structure in combination with the magnetic particles of the magnetic layer 4b. Further, the magnetic particles of the magnetic layer 4b form a columnar structure in combination with the nonmagnetic particles of the nonmagnetic layer 7b and these nonmagnetic particles form a columnar structure in combination with the magnetic particles of the magnetic layer 4c. When the magnetic particles and nonmagnetic particles of these magnetic layer and nonmagnetic layer form columnar structures, the oxide in the magnetic layer 4a is connected with the oxide in the nonmagnetic layer 7a in the case where the nonmagnetic layer 7a has a granular structure and the oxide of the nonmagnetic layer 7a is connected with the oxide in the magnetic layer 4b having a granular structure.

A target made of a material containing Co as its major component, at least Cr and an oxide is used and the chamber which is used for formation is evacuated until the degree of vacuum reaches $10^{-4}$ to $10^{-7}$. In this condition, Ar gas is introduced as sputtering gas to carry out the formation of a film by sputtering. At this time, the power to be supplied is 0.1 to 2 kW, and the discharge time and the power to be supplied can be adjusted to obtain a desired film thickness.

At this time, the pressure of the sputtering gas is preferably designed to be 0.8 Pa or more and 10 Pa or less. Also, it is preferable to set the discharge power as low as possible, so that it takes a longer time to form a film within an allowable range of time in the process. The reason why this condition is defined is that the magnetic particles are dispersed in the oxide and also, a columnar structure in which the magnetic particles vertically penetrate through the magnetic layer 4a is easily obtained.

Also, although argon is used as the sputtering gas when the magnetic layers 4a and 4b containing the oxide are formed, it is preferable to properly use inert gas such as neon, xenon or krypton in place of argon as the sputtering gas. Also, it is also effective to add nitrogen gas, oxygen gas or both as necessary.

When adding nitrogen, oxygen or both, a mixture gas of these gases and argon may be used, or each gas may be introduced separately and mixed in the chamber.

The amount of nitrogen, oxygen or both to be added is preferably 6% by volume or less (more preferably 3% by volume or less) based on argon. When the amount of nitrogen or oxygen to be added exceeds the above range, it is undesirable because the crystallinity and orientation of the magnetic particles are impaired, with the result that there is a fear that the recording and reproducing characteristics are deteriorated.

For example, as the condition under which a material of (Co14Cr18Pt)90-(SiO$_2$)10 is used for the magnetic layers 4a and 4b, the sputtering discharge power is preferably 0.4 kW, the pressure is preferably 1 to 5 Pa and the amount of oxygen to be added is preferably 0 to 2% by volume.

Also, when the magnetic layers 4a and 4b are formed, negative voltage (substrate bias) may be applied to the nonmagnetic substrate 1. This promotes the separation of the magnetic particles from the oxide and therefore, the magnetic particles are more micronized and isolated, with the result that the recording and reproducing characteristics suitable for higher-density recording are obtained.

The substrate bias is preferably applied at a voltage range from −20 V to −300 V. When the substrate bias exceeds the above range, there is a fear that the crystallinity and orientation of the magnetic particles are impaired, which is undesirable. Also, when the substrate bias is less than the above range, this is undesirable because no effect is obtained.

Next, the magnetic layer 4c containing no oxide is formed in the same manner by the sputtering method using a sputtering target. As the material suitable for the magnetic layer 4c, Co14-24Cr8-22Pt{content of Cr: 14 to 24 at % and content of Pt: 8 to 22 at %, balanced with Co} is preferable as a CoCrPt type, and Co10-24Cr8-22Pt0-16B{content of Cr: 10 to 24 at %, content of Pt: 8 to 22 at % and content of B: 0 to 16 at %, balanced with Co} is preferable as a CoCrPtB type. As to other types, examples of the material suitable for the magnetic layer 4c may include Co10-24Cr8-22Pt1-5Ta{content of Cr: 10 to 24 at %, content of Pt: 8 to 22 at % and content of Ta: 1 to 5 at %, balanced with Co} as CoCrPtTa type, Co10-24Cr8-22Pt1-5Ta1-10B{content of Cr: 10 to 24 at %, content of Pt: 8 to 22 at %, content of Ta: 1 to 5 at % and content of B: 1 to 10 at %, balanced with Co} as CoCrPtTaB type, and besides, CoCrPtBNd type, CoCrPtTaNd type, CoCrPtNb type, CoCrPtBW, CoCrPtMo, CoCrPtCuRu and CoCrPtRe.

The condition under which the magnetic layer 4c is formed is, for example, as follows.

Using a target made of a material containing Co as its major component, at least Cr and no oxide, the chamber used for the formation of the magnetic layer 4c is evacuated until the degree of vacuum reaches $10^{-4}$ to $10^{-7}$ Pa. In this condition, Ar gas is introduced as the sputtering gas to carry out the formation of a film by sputtering. At this time, the power to be supplied is 0.1 kW to 2 kW, and the discharge time and the power to be supplied can be adjusted to obtain a desired film thickness.

At this time, the pressure of the sputtering gas is preferably designed to be 3 Pa or less.

Also, although argon is used as the sputtering gas when the magnetic layer 4c containing no oxide is formed, it is possible to properly use inert gas such as neon, xenon or krypton in place of argon as the sputtering gas. Also, it is also effective to add nitrogen gas, oxygen gas or both as necessary.

When adding nitrogen, oxygen or both, a mixture gas of these gases and argon may be used, or each gas may be introduced separately and mixed in the chamber.

The amount of nitrogen, oxygen or both to be added is preferably 3% by volume or less (more preferably 1% by volume or less) based on argon. When the amount of nitrogen or oxygen to be added exceeds the above range, this is undesirable because the crystallinity and orientation of the magnetic particles are impaired, with the result that there is a fear that the recording and reproducing characteristics are deteriorated.

Also, when the magnetic layer 4c is formed, negative voltage (substrate bias) may be applied to the nonmagnetic substrate 1. This ensures that the magnetic particles are more micronized and isolated, with the result that the recording and reproducing characteristics suitable for higher-density recording are obtained.

The substrate bias is preferably applied at a voltage range from −50 V to −400 V. When the substrate bias exceeds the above range, there is a fear that the crystallinity and orientation of the magnetic particles are impaired, which is undesirable. Also, when the substrate bias is less than the above range, this is undesirable because no effect is obtained.

After the vertical magnetic layer 4 is formed, the protective layer 5 containing, for example, carbon as its major component is formed by a known method, for example, the sputtering method, plasma CVD method or a combination of these methods.

Moreover, a perfluoropolyether lubricant which is a fluorochemical lubricant is applied to the surface of the protective layer 5 by the dipping method, spin coating method or the like to form the lubricant layer 6 according to the need.

Figure 3:
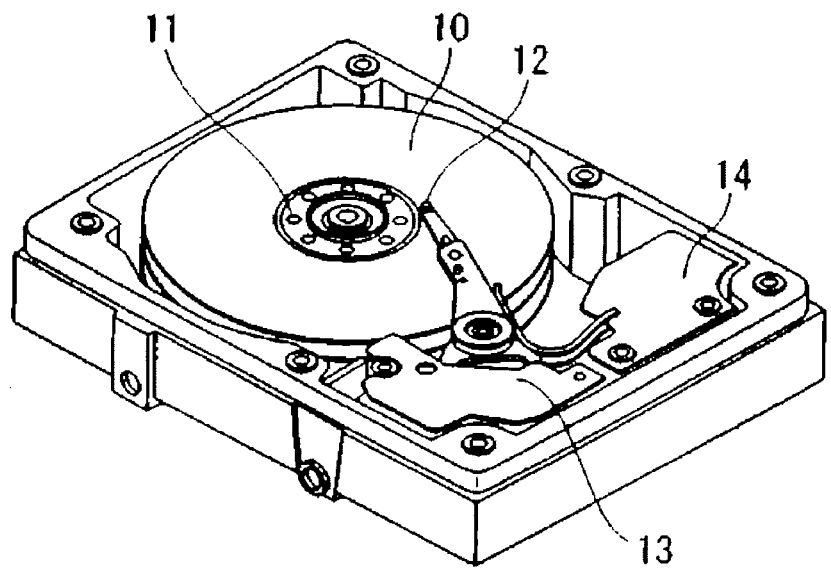
FIG. 3 is a schematic view showing a magnetic recording and reproducing device according to the present invention.

FIG. 3 is a schematic view showing an example of a magnetic recording and reproducing device according to the present invention. The magnetic recording and reproducing device shown here is provided with a magnetic recording medium 10 having the structure shown in FIG. 1, a medium drive section 11 that drives and rotates the magnetic recording medium 10, a magnetic head 12 that records information in and reproduces information from the magnetic recording medium 10, a head drive section 13 that makes the magnetic head 12 move relatively to the magnetic recording medium 10 and a recording and reproducing signal processing system 14. The recording and reproducing signal processing system 14 is so designed that it can process data inputted from the outside to feed record signals to the magnetic head 12 and process the reproducing signals from the magnetic head 12 to feed data to the outside. As the magnetic head 12 to be used in the magnetic recording and reproducing device of the present invention, a head may be used which is provided with a GMR element utilizing "giant magnetic resistance (GMR) effect" as a reproducing element and is more suitable for high recording density.

According to the above magnetic recording and reproducing device, the magnetic recording medium of the present invention is used as the magnetic recording medium 10 and therefore, the micronization and magnetic isolation of the magnetic particles are promoted, making it possible to remarkably improve the S/N ratio also to improve the heat fluctuation characteristics during the course of reproduction. Therefore, a medium having more excellent recording characteristics (OW) can be obtained, with the result that an excellent magnetic recording and reproducing device suitable for high-density recording can be produced.

EXAMPLES

Example 1

A washed glass substrate (manufactured by Konica Minolta Co., Ltd., outside diameter: 2.5 inch) was put in a film-forming chamber of a DC magnetron sputtering apparatus (trade name: C-3040, manufactured by Anerva Corporation) and the film-forming chamber was evacuated until the ultimate degree of vacuum reached $1\times10^{-15}$ Pa. Then, an adhesion layer having a thickness of 10 nm was formed on this glass substrate by using a Cr target. Using a target of Co-20Fe-5Zr-5Ta {content of Fe: 20 at %, content of Zr: 5 at % and content of Ta: 5 at %, balanced with Co}, a soft magnetic layer having a thickness of 25 nm was formed at a substrate temperature of 100° C. or less. A Ru layer was formed on the soft magnetic layer in a thickness of 0.7 nm and then, a soft magnetic layer of Co-20Fe-5Zr-5Ta was formed in a thickness of 25 nm as a soft magnetic under layer 2. The product Bs·t (T·nm) of the saturated magnetic flux density Bs (T) and film thickness t (nm) of this layer was confirmed to be 65 (T·nm) by a vibration system magnetic characteristic measuring device (VSM).

Using a Ni-6W {content of W: 6 at %, balanced with Ni} target and a Ru-target, films were formed in thicknesses of 5 nm and 20 nm respectively on the soft magnetic under layer 2 in this order to make an orientation adjusting layer 3.

A magnetic layer 4a having a composition containing $(Co15Cr16Pt)91$-$(SiO_2)6$-$(TiO_2)3$ {91 mol % of an alloy (content of Cr: 15 at % and content of Pt: 18 at %, balanced with C), 6 mol % of an oxide made of $SiO_2$, 3 mol % of an oxide made of $Cr_2O_3$ and 3 mol % of an oxide made of $TiO_2$} was formed in a thickness of 3 nm on the orientation adjusting layer 3 under a sputtering pressure of 2 Pa. This film had a Ku of $2.0 \times 10^6$ (erg/cc) and a Ms of 500 (emu/cc).

A nonmagnetic layer 7a made of $(Co30Cr)88$-$(TiO_2)12$ was formed in a thickness of 0.3 nm on the magnetic layer 4a.

A magnetic layer 4b made of $(Co11Cr18Pt)92$-$(SiO_2)5$-$(TiO_2)3$ was formed in a thickness of 4 nm on the nonmagnetic layer 7a under a sputtering pressure of 2 Pa.

A nonmagnetic layer 7b made of Ru was formed in a thickness of 0.3 nm on the magnetic layer 4b. This layer had a Ku of $4 \times 10^6$ (erg/cc) and a Ms of 600 (emu/cc).

Using a target made of Co20Cr14Pt3B {content of Cr: 20 at %, content of Pt: 14 at % and content of B: 3 at %, balanced with Co}, a magnetic layer 4c was formed in a thickness of 4 nm on the nonmagnetic layer 7b under a sputtering pressure of 0.6 Pa. This layer had a Ku of $1.5 \times 10^6$ (erg/cc) and a Ms of 400 (emu/cc).

Then, a protective layer 5 having a film thickness of 3.0 nm was formed by the CVD method. Then, a lubricant layer 6 made of perfluoropolyether was formed by the dipping method to obtain a magnetic recording medium.

The magnetic characteristics of the obtained magnetic recording medium were evaluated. The magnetostatic characteristics of the magnetic recording medium were evaluated by measuring the coercive force (Hc) and reversed domain nucleation magnetic field (−Hn) using a Kerr effect measuring device. Also, it was confirmed that the recording layers were respectively bound by ferro-coupling.

Also, the recording and reproducing characteristics of the magnetic recording medium were evaluated by using the Read-Write Analyzer RWA1632 and Spin Stand S1701MP manufactured by GUZIK Co. Ltd. in USA. As the head, a head using a single magnetic pole for writing and a TMR element in the reproducing section was used.

The S/N ratio of the magnetic recording medium was measured at a recording density of 750 kFCI.

As to the recording characteristics (OW) of the magnetic recording medium, first, 750 kFCI signals were written in the medium and then, 100 kFCI signals were overwritten. Then, high-frequency components were extracted by a frequency filter to evaluate the data writing ability based on its residual ratio.

With regard to the evaluation of the heat fluctuation characteristics, the information was written in a recording density of 50 kFCI at 70° C. and the attenuation rate of an output with respect to a reproducing output measured one second after the information was written was calculated based on the following equation: $(So-S) \times 100/(So)$. In this equation, so represents the reproducing output measured one second after the information was written and S represents reproducing output measured after 10000 seconds. The results are shown in a section of Example 1 of Table 1.

TABLE 1

| | Soft magnetic under layer | | Orientation adjusting layer | | | | Magnetic layer 4a | | |
|---|---|---|---|---|---|---|---|---|---|
| | Composition (mol %) | Bs * t (T · nm) | Composition (mol %) | Thickness (nm) | Composition (mol %) | Thickness (nm) | Composition (mol %) | Ku (×10$^6$ erg/cm$^2$) | Thickness (nm) |
| Example 1 | Co20Fe5Zr5Ta | 65 | Ni6W | 5 | Ru | 20 | 91(Co15Cr16Pt)—6SiO2—3TiO2 | 2.2 | 3 |
| Example 1-2 | Co20Fe5Zr5Ta | 65 | Ni6W | 5 | Ru | 20 | 91(Co15Cr16Pt)—6SiO2—3TiO2 | 2.2 | 3 |
| Example 1-3 | Co20Fe5Zr5Ta | 65 | Ni6W | 5 | Ru | 20 | 91(Co15Cr16Pt)—6SiO2—3TiO2 | 2.2 | 3 |
| Comparative Example 1 | Co20Fe5Zr5Ta | 65 | Ni6W | 5 | Ru | 20 | 91(Co15Cr16Pt)—6SiO2—3TiO2 | 2.2 | 3 |
| Comparative Example 2 | Co20Fe5Zr5Ta | 65 | Ni6W | 5 | Ru | 20 | 91(Co9Cr16Pt)—6SiO2—3TiO2 | 4.1 | 3 |
| Comparative Example 3 | Co20Fe5Zr5Ta | 65 | Ni6W | 5 | Ru | 20 | 91(Co19Cr16Pt)—6SiO2—3TiO2 | 0.9 | 3 |
| Comparative Example 4 | Co20Fe5Zr5Ta | 65 | Ni6W | 5 | Ru | 20 | 91(Co15Cr16Pt)—6SiO2—3TiO2 | 2.2 | 3 |
| Comparative Example 5 | Co20Fe5Zr5Ta | 65 | Ni6W | 5 | Ru | 20 | 91(Co15Cr16Pt)—6SiO2—3TiO2 | 2.2 | 3 |
| Comparative Example 6 | Co20Fe5Zr5Ta | 65 | Ni6W | 5 | Ru | 20 | 91(Co15Cr16Pt)—6SiO2—3TiO2 | 2.2 | 3 |
| Comparative Example 7 | Co20Fe5Zr5Ta | 65 | Ni6W | 5 | Ru | 20 | 91(Co15Cr16Pt)—6SiO2—3TiO2 | 2.2 | 3 |

| | Nonmagnetic 7a | | Magnetic layer 4b | | | Nonmagnetic 7b | |
|---|---|---|---|---|---|---|---|
| | Composition (mol %) | Thickness (nm) | Composition (mol %) | Ku (×10$^6$ erg/cm$^2$) | Thickness (nm) | Composition (mol %) | Thickness (nm) |
| Example 1 | 88(Co30Cr)—12TiO2 | 1 | 92(Co11Cr18Pt)—5SiO2—3TiO2 | 4.0 | 4 | Ru | 0.3 |
| Example 1-2 | — | — | 92(Co11Cr18Pt)—5SiO2—3TiO2 | 4.0 | 4 | Ru | 0.3 |
| Example 1-3 | 88(Co30Cr)—12TiO2 | 1 | 92(Co11Cr18Pt)—5SiO2—3TiO2 | 4.0 | 4 | — | — |
| Comparative Example 1 | — | — | 92(Co11Cr18Pt)—5SiO2—3TiO2 | 4.0 | 4 | — | — |
| Comparative Example 2 | 88(Co30Cr)—12TiO2 | 1 | 92(Co11Cr18Pt)—5SiO2—3TiO2 | 4.0 | 4 | Ru | 0.3 |
| Comparative Example 3 | 88(Co30Cr)—12TiO2 | 1 | 92(Co11Cr18Pt)—5SiO2—3TiO2 | 4.0 | 4 | Ru | 0.3 |
| Comparative Example 4 | 88(Co30Cr)—12TiO2 | 1 | 92(Co3Cr18Pt)—5SiO2—3TiO2 | 7.2 | 4 | Ru | 0.3 |

TABLE 1-continued

| | | | | | | | |
|---|---|---|---|---|---|---|---|
| Comparative Example 5 | 88(Co30Cr)—12TiO2 | 1 | 92(Co16Cr18Pt)—5SiO2—3TiO2 | 1.9 | 4 | Ru | 0.3 |
| Comparative Example 6 | 88(Co30Cr)—12TiO2 | 1 | 92(Co11Cr18Pt)—5SiO2—3TiO2 | 4.0 | 4 | Ru | 0.3 |
| Comparative Example 7 | 88(Co30Cr)—12TiO2 | 1 | 92(Co11Cr18Pt)—5SiO2—3TiO2 | 4.0 | 4 | Ru | 0.3 |

| | Magnetic layer 4c | | | Magnetostatic characteristics | | Recording and reproducing characteristics | | Heat |
|---|---|---|---|---|---|---|---|---|
| | Composition (mol %) | Ku (×10$^6$ erg/cm$^2$) | Thickness (nm) | Hc (Oe) | Hn (Oe) | S/N (dB) | OW (dB) | fluctuation (%) |
| Example 1 | Co20Cr14Pt3B | 1.5 | 4 | 4855 | 2324 | 16.8 | 37.2 | 0.4 |
| Example 1-2 | Co20Cr14Pt3B | 1.5 | 4 | 5092 | 2445 | 15.1 | 29.1 | 0.3 |
| Example 1-3 | Co20Cr14Pt3B | 1.5 | 4 | 4988 | 2396 | 15.3 | 32.1 | 0.4 |
| Comparative Example 1 | Co20Cr14Pt3B | 1.5 | 4 | 5235 | 2453 | 14.8 | 28.3 | 0.3 |
| Comparative Example 2 | Co20Cr14Pt3B | 1.5 | 4 | 5046 | 2576 | 15.7 | 30.1 | 0.3 |
| Comparative Example 3 | Co20Cr14Pt3B | 1.5 | 4 | 4775 | 2270 | 17.0 | 29.3 | 0.5 |
| Comparative Example 4 | Co20Cr14Pt3B | 1.5 | 4 | 5273 | 2663 | 15.9 | 28.4 | 0.2 |
| Comparative Example 5 | Co20Cr14Pt3B | 1.5 | 4 | 4217 | 1833 | 16.7 | 30.4 | 0.8 |
| Comparative Example 6 | Co8Cr14Pt3B | 4.1 | 3 | 4727 | 2211 | 16.6 | 30.4 | 0.2 |
| Comparative Example 7 | Co25Cr14Pt3B | 0.7 | 5 | 4746 | 2352 | 16.1 | 30.6 | 0.5 |

Example 1-2, Example 1-3, Comparative Example 1

A vertical magnetic recording medium was produced in Example 1-2 in the same manner as in Example 1 except for the nonmagnetic layer 7a was not formed, a vertical magnetic recording medium was produced in Example 1-3 in the same manner as in Example 1 except for the nonmagnetic layer 7b was not formed and a vertical magnetic recording medium was produced in Comparative Example 1 in the same manner as in Example 1 except for the nonmagnetic layers 7a and 7b were not formed. The results are shown in Table 1.

As shown in Table 1, it was found that Example 1 had a higher S/N ratio and higher OW characteristics required for high-density recording as compared with Examples 1-2, 1-3 and Comparative Example 1 in which the nonmagnetic layer 7a or 7b (or both) was not formed.

Comparative Examples 2 to 7

Vertical magnetic recording mediums were obtained in the same manner as in Example 1 except that the value of Ku of each of magnetic layers 4a, 4b and 4c was changed. The results are shown in Table 1. As shown in Table 1, a magnetic recording medium having a high S/N ratio and OW characteristics required for high-density recording was obtained when the value of Ku of the magnetic layer was made to fall within the above range according to the present invention.

Examples 2 to 37

Vertical magnetic recording mediums were obtained in the same manner as in Example 1 except that the material and film thickness of each of the magnetic layers 4a, 4b and 4c were changed. The results are shown in Tables 2 to 4.

TABLE 2

| | Soft magnetic under layer | | Orientation adjusting layer | | | | Magnetic layer 4a |
|---|---|---|---|---|---|---|---|
| | Composition (mol %) | Bs * t (T · nm) | Composition (mol %) | Thickness (nm) | Composition (mol %) | Thickness (nm) | Composition (mol %) |
| Example 1 | Co20Fe5Zr5Ta | 65 | Ni6W | 5 | Ru | 20 | 91(Co15Cr16Pt)—6SiO2—3TiO2 |
| Example 2 | Co20Fe5Zr5Ta | 65 | Ni6W | 5 | Ru | 20 | 91(Co11Cr16Pt)—6SiO2—3TiO2 |
| Example 3 | Co20Fe5Zr5Ta | 65 | Ni6W | 5 | Ru | 20 | 91(Co18Cr16Pt)—6SiO2—3TiO2 |
| Example 4 | Co20Fe5Zr5Ta | 65 | Ni6W | 5 | Ru | 20 | 89(Co15Cr16Pt)—7SiO2—4TiO2 |
| Example 5 | Co20Fe5Zr5Ta | 65 | Ni6W | 5 | Ru | 20 | 92(Co15Cr16Pt)—5SiO2—3Cr2O3 |
| Example 6 | Co20Fe5Zr5Ta | 65 | Ni6W | 5 | Ru | 20 | 90(Co15Cr16Pt)—3TiO2—3SiO2—3Cr2O3 |
| Example 7 | Co20Fe5Zr5Ta | 65 | Ni6W | 5 | Ru | 20 | 94(Co15Cr16Pt)—3Ta2O5—3TiO2 |
| Example 8 | Co20Fe5Zr5Ta | 65 | Ni6W | 5 | Ru | 20 | 91(Co12Cr16Pt4B)—6SiO2—3TiO2 |
| Example 9 | Co20Fe5Zr5Ta | 65 | Ni6W | 5 | Ru | 20 | 91(Co10Cr16Pt7Ru)—6SiO2—3TiO2 |
| Example 10 | Co20Fe5Zr5Ta | 65 | Ni6W | 5 | Ru | 20 | 91(Co10Cr16Pt3Ta)—6SiO2—3TiO2 |
| Example 11 | Co20Fe5Zr5Ta | 65 | Ni6W | 5 | Ru | 20 | 91(Co10Cr16Pt5Mo)—6SiO2—3TiO2 |
| Example 12 | Co20Fe5Zr5Ta | 65 | Ni6W | 5 | Ru | 20 | 91(Co15Cr16Pt)—6SiO2—3TiO2 |
| Example 13 | Co20Fe5Zr5Ta | 65 | Ni6W | 5 | Ru | 20 | 91(Co15Cr16Pt)—6SiO2—3TiO2 |

TABLE 2-continued

| | | | | | | | |
|---|---|---|---|---|---|---|---|
| Example 14 | Co20Fe5Zr5Ta | 65 | Ni6W | 5 | Ru | 20 | 91(Co15Cr16Pt)—6SiO2—3TiO2 |
| Example 15 | Co20Fe5Zr5Ta | 65 | Ni6W | 5 | Ru | 20 | 91(Co15Cr16Pt)—6SiO2—3TiO2 |
| Example 16 | Co20Fe5Zr5Ta | 65 | Ni6W | 5 | Ru | 20 | 91(Co15Cr16Pt)—6SiO2—3TiO2 |
| Example 17 | Co20Fe5Zr5Ta | 65 | Ni6W | 5 | Ru | 20 | 91(Co15Cr16Pt)—6SiO2—3TiO2 |
| Example 18 | Co20Fe5Zr5Ta | 65 | Ni6W | 5 | Ru | 20 | 91(Co15Cr16Pt)—6SiO2—3TiO2 |
| Example 19 | Co20Fe5Zr5Ta | 65 | Ni6W | 5 | Ru | 20 | 91(Co15Cr16Pt)—6SiO2—3TiO2 |
| Example 20 | Co20Fe5Zr5Ta | 65 | Ni6W | 5 | Ru | 20 | 91(Co15Cr16Pt)—6SiO2—3TiO2 |
| Example 21 | Co20Fe5Zr5Ta | 65 | Ni6W | 5 | Ru | 20 | 91(Co15Cr16Pt)—6SiO2—3TiO2 |
| Example 22 | Co20Fe5Zr5Ta | 65 | Ni6W | 5 | Ru | 20 | 91(Co15Cr16Pt)—6SiO2—3TiO2 |
| Example 23 | Co20Fe5Zr5Ta | 65 | Ni6W | 5 | Ru | 20 | 91(Co15Cr16Pt)—6SiO2—3TiO2 |
| Example 24 | Co20Fe5Zr5Ta | 65 | Ni6W | 5 | Ru | 20 | 91(Co15Cr16Pt)—6SiO2—3TiO2 |
| Example 25 | Co20Fe5Zr5Ta | 65 | Ni6W | 5 | Ru | 20 | 91(Co15Cr16Pt)—6SiO2—3TiO2 |
| Example 26 | Co20Fe5Zr5Ta | 65 | Ni6W | 5 | Ru | 20 | 91(Co15Cr16Pt)—6SiO2—3TiO2 |
| Example 27 | Co20Fe5Zr5Ta | 65 | Ni6W | 5 | Ru | 20 | 91(Co15Cr16Pt)—6SiO2—3TiO2 |
| Example 28 | Co20Fe5Zr5Ta | 65 | Ni6W | 5 | Ru | 20 | 91(Co15Cr16Pt)—6SiO2—3TiO2 |
| Example 29 | Co20Fe5Zr5Ta | 65 | Ni6W | 5 | Ru | 20 | 91(Co15Cr16Pt)—6SiO2—3TiO2 |
| Example 30 | Co20Fe5Zr5Ta | 65 | Ni6W | 5 | Ru | 20 | 91(Co15Cr16Pt)—6SiO2—3TiO2 |
| Example 31 | Co20Fe5Zr5Ta | 65 | Ni6W | 5 | Ru | 20 | 91(Co15Cr16Pt)—6SiO2—3TiO2 |
| Example 32 | Co20Fe5Zr5Ta | 65 | Ni6W | 5 | Ru | 20 | 91(Co15Cr16Pt)—6SiO2—3TiO2 |
| Example 33 | Co20Fe5Zr5Ta | 65 | Ni6W | 5 | Ru | 20 | 91(Co15Cr16Pt)—6SiO2—3TiO2 |
| Example 34 | Co20Fe5Zr5Ta | 65 | Ni6W | 5 | Ru | 20 | 91(Co15Cr16Pt)—6SiO2—3TiO2 |
| Example 35 | Co20Fe5Zr5Ta | 65 | Ni6W | 5 | Ru | 20 | 91(Co15Cr16Pt)—6SiO2—3TiO2 |
| Example 36 | Co20Fe5Zr5Ta | 65 | Ni6W | 5 | Ru | 20 | 91(Co11Cr16Pt)—6SiO2—3TiO2 |
| Example 37 | Co20Fe5Zr5Ta | 65 | Ni6W | 5 | Ru | 20 | 91(Co11Cr16Pt)—6SiO2—3TiO2 |

| | Magnetic layer 4a | | Nonmagnetic 7a | |
|---|---|---|---|---|
| | Ku ($\times 10^6$ erg/cm$^2$) | Thickness (nm) | Composition (mol %) | Thickness (nm) |
| Example 1 | 2.0 | 3 | 88(Co30Cr)—12TiO2 | 1 |
| Example 2 | 3.9 | 3 | 88(Co30Cr)—12TiO2 | 1 |
| Example 3 | 1.1 | 3 | 88(Co30Cr)—12TiO2 | 1 |
| Example 4 | 1.8 | 3 | 88(Co30Cr)—12TiO2 | 1 |
| Example 5 | 2.4 | 3 | 88(Co30Cr)—12TiO2 | 1 |
| Example 6 | 2.1 | 3 | 88(Co30Cr)—12TiO2 | 1 |
| Example 7 | 2.1 | 3 | 88(Co30Cr)—12TiO2 | 1 |
| Example 8 | 1.6 | 3 | 88(Co30Cr)—12TiO2 | 1 |
| Example 9 | 2.1 | 3 | 88(Co30Cr)—12TiO2 | 1 |
| Example 10 | 2.3 | 3 | 88(Co30Cr)—12TiO2 | 1 |
| Example 11 | 1.8 | 3 | 88(Co30Cr)—12TiO2 | 1 |
| Example 12 | 2.0 | 1 | 88(Co30Cr)—12TiO2 | 1 |
| Example 13 | 2.0 | 2 | 88(Co30Cr)—12TiO2 | 1 |
| Example 14 | 2.0 | 4 | 88(Co30Cr)—12TiO2 | 1 |
| Example 15 | 2.0 | 5 | 88(Co30Cr)—12TiO2 | 1 |
| Example 16 | 2.0 | 3 | 88(Co30Cr)—12TiO2 | 1 |
| Example 17 | 2.0 | 3 | 88(Co30Cr)—12TiO2 | 1 |
| Example 18 | 2.0 | 3 | 88(Co30Cr)—12TiO2 | 1 |
| Example 19 | 2.0 | 3 | 88(Co30Cr)—12TiO2 | 1 |
| Example 20 | 2.0 | 3 | 88(Co30Cr)—12TiO2 | 1 |
| Example 21 | 2.0 | 3 | 88(Co30Cr)—12TiO2 | 1 |
| Example 22 | 2.0 | 3 | 88(Co30Cr)—12TiO2 | 1 |
| Example 23 | 2.0 | 3 | 88(Co30Cr)—12TiO2 | 1 |
| Example 24 | 2.0 | 3 | 88(Co30Cr)—12TiO2 | 1 |
| Example 25 | 2.0 | 3 | 88(Co30Cr)—12TiO2 | 1 |
| Example 26 | 2.0 | 3 | 88(Co30Cr)—12TiO2 | 1 |

TABLE 2-continued

|  | | | | |
|---|---|---|---|---|
| Example 27 | 2.0 | 3 | 88(Co30Cr)—12TiO2 | 1 |
| Example 28 | 2.0 | 3 | 88(Co30Cr)—12TiO2 | 1 |
| Example 29 | 2.0 | 3 | 88(Co30Cr)—12TiO2 | 1 |
| Example 30 | 2.0 | 3 | 88(Co30Cr)—12TiO2 | 1 |
| Example 31 | 2.0 | 3 | 88(Co30Cr)—12TiO2 | 1 |
| Example 32 | 2.0 | 3 | 88(Co30Cr)—12TiO2 | 1 |
| Example 33 | 2.0 | 3 | 88(Co30Cr)—12TiO2 | 1 |
| Example 34 | 2.0 | 3 | 88(Co30Cr)—12TiO2 | 1 |
| Example 35 | 2.0 | 3 | 88(Co30Cr)—12TiO2 | 1 |
| Example 36 | 3.9 | 3 | 88(Co30Cr)—12TiO2 | 1 |
| Example 37 | 3.9 | 3 | 88(Co30Cr)—12TiO2 | 1 |

TABLE 3

| | Magnetic layer 4b | | | Nonmagnetic 7b | | Magnetic layer 4c | | |
|---|---|---|---|---|---|---|---|---|
| | Composition (mol %) | Ku (×10⁶ erg/cm²) | Thickness (nm) | Composition (mol %) | Thickness (nm) | Composition (mol %) | Ku (×10⁶ erg/cm²) | Thickness (nm) |
| Example 1 | 92(Co11Cr18Pt)—5SiO2—3TiO2 | 4.0 | 4 | Ru | 0.3 | Co20Cr14Pt3B | 1.5 | 4 |
| Example 2 | 92(Co11Cr18Pt)—5SiO2—3TiO2 | 4.0 | 4 | Ru | 0.3 | Co20Cr14Pt3B | 1.5 | 4 |
| Example 3 | 92(Co11Cr18Pt)—5SiO2—3TiO2 | 4.0 | 4 | Ru | 0.3 | Co20Cr14Pt3B | 1.5 | 4 |
| Example 4 | 92(Co11Cr18Pt)—5SiO2—3TiO2 | 4.0 | 4 | Ru | 0.3 | Co20Cr14Pt3B | 1.5 | 4 |
| Example 5 | 92(Co11Cr18Pt)—5SiO2—3TiO2 | 4.0 | 4 | Ru | 0.3 | Co20Cr14Pt3B | 1.5 | 4 |
| Example 6 | 92(Co11Cr18Pt)—5SiO2—3TiO2 | 4.0 | 4 | Ru | 0.3 | Co20Cr14Pt3B | 1.5 | 4 |
| Example 7 | 92(Co11Cr18Pt)—5SiO2—3TiO2 | 4.0 | 4 | Ru | 0.3 | Co20Cr14Pt3B | 1.5 | 4 |
| Example 8 | 92(Co11Cr18Pt)—5SiO2—3TiO2 | 4.0 | 4 | Ru | 0.3 | Co20Cr14Pt3B | 1.5 | 4 |
| Example 9 | 92(Co11Cr18Pt)—5SiO2—3TiO2 | 4.0 | 4 | Ru | 0.3 | Co20Cr14Pt3B | 1.5 | 4 |
| Example 10 | 92(Co11Cr18Pt)—5SiO2—3TiO2 | 4.0 | 4 | Ru | 0.3 | Co20Cr14Pt3B | 1.5 | 4 |
| Example 11 | 92(Co11Cr18Pt)—5SiO2—3TiO2 | 4.0 | 4 | Ru | 0.3 | Co20Cr14Pt3B | 1.5 | 4 |
| Example 12 | 92(Co11Cr18Pt)—5SiO2—3TiO2 | 4.0 | 4 | Ru | 0.3 | Co20Cr14Pt3B | 1.5 | 4 |
| Example 13 | 92(Co11Cr18Pt)—5SiO2—3TiO2 | 4.0 | 4 | Ru | 0.3 | Co20Cr14Pt3B | 1.5 | 4 |
| Example 14 | 92(Co11Cr18Pt)—5SiO2—3TiO2 | 4.0 | 4 | Ru | 0.3 | Co20Cr14Pt3B | 1.5 | 4 |
| Example 15 | 92(Co11Cr18Pt)—5SiO2—3TiO2 | 4.0 | 4 | Ru | 0.3 | Co20Cr14Pt3B | 1.5 | 4 |
| Example 16 | 92(Co5Cr18Pt)—5SiO2—3TiO2 | 7.0 | 4 | Ru | 0.3 | Co20Cr14Pt3B | 1.5 | 4 |
| Example 17 | 92(Co15Cr18Pt)—5SiO2—3TiO2 | 2.1 | 4 | Ru | 0.3 | Co20Cr14Pt3B | 1.5 | 4 |
| Example 18 | 90(Co11Cr16Pt)—6SiO2—4TiO2 | 3.4 | 4 | Ru | 0.3 | Co20Cr14Pt3B | 1.5 | 4 |
| Example 19 | 93(Co11Cr16Pt)—4SiO2—3Cr2O3 | 4.2 | 4 | Ru | 0.3 | Co20Cr14Pt3B | 1.5 | 4 |
| Example 20 | 91(Co11Cr16Pt)—3TiO2—3SiO2—3Cr2O3 | 3.9 | 4 | Ru | 0.3 | Co20Cr14Pt3B | 1.5 | 4 |
| Example 21 | 95(Co11Cr16Pt)—2Ta2O5—3Cr2O3 | 4.4 | 4 | Ru | 0.3 | Co20Cr14Pt3B | 1.5 | 4 |
| Example 22 | 92(C8Cr16Pt4B)—5SiO2—3TiO2 | 4.2 | 4 | Ru | 0.3 | Co20Cr14Pt3B | 1.5 | 4 |
| Example 23 | 92(Co7Cr16Pt7Ru)—5SiO2—3TiO2 | 3.9 | 4 | Ru | 0.3 | Co20Cr14Pt3B | 1.5 | 4 |
| Example 24 | 92(Co7Cr16Pt3Ta)—5SiO2—3TiO2 | 3.7 | 4 | Ru | 0.3 | Co20Cr14Pt3B | 1.5 | 4 |
| Example 25 | 92(Co5Cr16Pt5Mo)—5SiO2—3TiO2 | 3.8 | 4 | Ru | 0.3 | Co20Cr14Pt3B | 1.5 | 4 |
| Example 26 | 92(Co11Cr18Pt)—5SiO2—3TiO2 | 4.0 | 3 | Ru | 0.3 | Co20Cr14Pt3B | 1.5 | 4 |
| Example 27 | 92(Co11Cr18Pt)—5SiO2—3TiO2 | 4.0 | 5 | Ru | 0.3 | Co20Cr14Pt3B | 1.5 | 4 |
| Example 28 | 92(Co11Cr18Pt)—5SiO2—3TiO2 | 4.0 | 6 | Ru | 0.3 | Co20Cr14Pt3B | 1.5 | 4 |
| Example 29 | 92(Co11Cr18Pt)—5SiO2—3TiO2 | 4.0 | 4 | Ru | 0.3 | Co23Cr14Pt3B | 1.0 | 5 |
| Example 30 | 92(Co11Cr18Pt)—5SiO2—3TiO2 | 4.0 | 4 | Ru | 0.3 | Co17Cr14Pt3B | 2.9 | 3 |
| Example 31 | 92(Co11Cr18Pt)—5SiO2—3TiO2 | 4.0 | 4 | Ru | 0.3 | Co17Cr14Pt—6B | 1.7 | 4 |
| Example 32 | 92(Co11Cr18Pt)—5SiO2—3TiO2 | 4.0 | 4 | Ru | 0.3 | Co15Cr14Pt—6B | 2.1 | 4 |

TABLE 3-continued

| | Magnetic layer 4b | | Thick- | Nonmagnetic 7b | | Magnetic layer 4c | | |
|---|---|---|---|---|---|---|---|---|
| | Composition (mol %) | Ku (×10⁶ erg/cm²) | ness (nm) | Composition (mol %) | Thickness (nm) | Composition (mol %) | Ku (×10⁶ erg/cm²) | Thickness (nm) |
| Example 33 | 92(Co11Cr18Pt)—5SiO2—3TiO2 | 4.0 | 4 | Ru | 0.3 | Co14Cr14Pt3B3Ta | 1.9 | 4 |
| Example 34 | 92(Co11Cr18Pt)—5SiO2—3TiO2 | 4.0 | 4 | Ru | 0.3 | Co12Cr14Pt6B2Mo | 1.7 | 4 |
| Example 35 | 92(Co11Cr18Pt)—5SiO2—3TiO2 | 4.0 | 4 | Ru | 0.3 | Co20Cr14Pt3Mn | 1.4 | 4 |
| Example 36 | 92(Co5Cr18Pt)—5SiO2—3TiO2 | 7.0 | 4 | Ru | 0.3 | Co17Cr14Pt3B | 2.9 | 3 |
| Example 37 | 92(Co5Cr18Pt)—5SiO2—3TiO2 | 4.0 | 4 | Ru | 0.3 | Co10Cr14Pt—3B | 3.8 | 3 |

TABLE 4

| | Magnetostatic characteristics | | Recording and reproducing characteristics | | Heat fluctuation |
|---|---|---|---|---|---|
| | Hc (Oe) | Hn (Oe) | S/N (dB) | OW (dB) | (%) |
| Example 1 | 4855 | 2324 | 16.8 | 37.2 | 0.4 |
| Example 2 | 5012 | 2533 | 16.2 | 34.8 | 0.3 |
| Example 3 | 4775 | 2270 | 16.9 | 33.2 | 0.4 |
| Example 4 | 4820 | 2292 | 16.8 | 35.2 | 0.4 |
| Example 5 | 4910 | 2462 | 16.7 | 36.6 | 0.3 |
| Example 6 | 4927 | 2377 | 17.1 | 36.1 | 0.2 |
| Example 7 | 4673 | 2381 | 16.6 | 37.4 | 0.4 |
| Example 8 | 4673 | 2216 | 16.9 | 35.3 | 0.3 |
| Example 9 | 4764 | 2373 | 16.8 | 37.1 | 0.3 |
| Example 10 | 4875 | 2411 | 16.6 | 36.1 | 0.4 |
| Example 11 | 4611 | 2326 | 16.7 | 35.8 | 0.4 |
| Example 12 | 4635 | 2166 | 16.3 | 34.7 | 0.5 |
| Example 13 | 4775 | 2200 | 16.7 | 36.1 | 0.4 |
| Example 14 | 4905 | 2434 | 16.4 | 36.1 | 0.2 |
| Example 15 | 4933 | 2543 | 16.4 | 35.1 | 0.2 |
| Example 16 | 5221 | 2658 | 16.5 | 36.1 | 0.2 |
| Example 17 | 4462 | 2016 | 17.1 | 35.1 | 0.6 |
| Example 18 | 4659 | 2100 | 17 | 37.2 | 0.4 |
| Example 19 | 4815 | 2288 | 16.7 | 36.5 | 0.3 |
| Example 20 | 4767 | 2310 | 16.7 | 37.1 | 0.4 |
| Example 21 | 4874 | 2256 | 16.5 | 36.5 | 0.3 |
| Example 22 | 4789 | 2319 | 16.7 | 37 | 0.4 |
| Example 23 | 4655 | 2197 | 17 | 36.9 | 0.4 |
| Example 24 | 4777 | 2264 | 16.6 | 36.2 | 0.4 |
| Example 25 | 4599 | 2074 | 16.9 | 37.3 | 0.5 |
| Example 26 | 4665 | 2102 | 17.1 | 38.5 | 0.6 |
| Example 27 | 4915 | 2463 | 16.6 | 36.1 | 0.3 |
| Example 28 | 5022 | 2611 | 16.1 | 34.9 | 0.1 |
| Example 29 | 4786 | 2318 | 16.6 | 34.9 | 0.5 |
| Example 30 | 4847 | 2361 | 16.2 | 33.1 | 0.3 |
| Example 31 | 4784 | 2289 | 16.5 | 37.5 | 0.4 |
| Example 32 | 4688 | 2311 | 16.3 | 38.1 | 0.3 |
| Example 33 | 4649 | 2194 | 16.2 | 38.5 | 0.4 |
| Example 34 | 4772 | 2218 | 16.6 | 37.5 | 0.4 |
| Example 35 | 4844 | 2319 | 17.1 | 37.2 | 0.4 |
| Example 36 | 4811 | 2377 | 16.9 | 35.1 | 0.3 |
| Example 37 | 4711 | 2185 | 17 | 33.7 | 0.2 |

Examples 38 to 66

Vertical magnetic recording mediums were obtained in the same manner as in Example 1 except that the material and film thickness of each of the nonmagnetic layers 7a and 7b were changed. The results are shown in Tables 5 to 7.

TABLE 5

| | Soft magnetic under layer | | Orientation adjusting layer | | | | Magnetic layer 4a |
|---|---|---|---|---|---|---|---|
| | Composition (mol %) | Bs * t (T · nm) | Composition (mol %) | Thickness (nm) | Composition (mol %) | Thickness (nm) | Composition (mol %) |
| Example 1 | Co20Fe5Zr5Ta | 65 | Ni6W | 5 | Ru | 20 | 91(Co15Cr16Pt)—6SiO2—3TiO2 |
| Example 38 | Co20Fe5Zr5Ta | 65 | Ni6W | 5 | Ru | 20 | 91(Co15Cr16Pt)—6SiO2—3TiO2 |
| Example 39 | Co20Fe5Zr5Ta | 65 | Ni6W | 5 | Ru | 20 | 91(Co15Cr16Pt)—6SiO2—3TiO2 |
| Example 40 | Co20Fe5Zr5Ta | 65 | Ni6W | 5 | Ru | 20 | 91(Co15Cr16Pt)—6SiO2—3TiO2 |
| Example 41 | Co20Fe5Zr5Ta | 65 | Ni6W | 5 | Ru | 20 | 91(Co15Cr16Pt)—6SiO2—3TiO2 |
| Example 42 | Co20Fe5Zr5Ta | 65 | Ni6W | 5 | Ru | 20 | 91(Co15Cr16Pt)—6SiO2—3TiO2 |
| Example 43 | Co20Fe5Zr5Ta | 65 | Ni6W | 5 | Ru | 20 | 91(Co15Cr16Pt)—6SiO2—3TiO2 |
| Example 44 | Co20Fe5Zr5Ta | 65 | Ni6W | 5 | Ru | 20 | 91(Co15Cr16Pt)—6SiO2—3TiO2 |
| Example 45 | Co20Fe5Zr5Ta | 65 | Ni6W | 5 | Ru | 20 | 91(Co15Cr16Pt)—6SiO2—3TiO2 |
| Example 46 | Co20Fe5Zr5Ta | 65 | Ni6W | 5 | Ru | 20 | 91(Co15Cr16Pt)—6SiO2—3TiO2 |
| Example 47 | Co20Fe5Zr5Ta | 65 | Ni6W | 5 | Ru | 20 | 91(Co15Cr16Pt)—6SiO2—3TiO2 |
| Example 48 | Co20Fe5Zr5Ta | 65 | Ni6W | 5 | Ru | 20 | 91(Co15Cr16Pt)—6SiO2—3TiO2 |
| Example 49 | Co20Fe5Zr5Ta | 65 | Ni6W | 5 | Ru | 20 | 91(Co15Cr16Pt)—6SiO2—3TiO2 |
| Example 50 | Co20Fe5Zr5Ta | 65 | Ni6W | 5 | Ru | 20 | 91(Co15Cr16Pt)—6SiO2—3TiO2 |
| Example 51 | Co20Fe5Zr5Ta | 65 | Ni6W | 5 | Ru | 20 | 91(Co15Cr16Pt)—6SiO2—3TiO2 |
| Example 52 | Co20Fe5Zr5Ta | 65 | Ni6W | 5 | Ru | 20 | 91(Co15Cr16Pt)—6SiO2—3TiO2 |
| Example 53 | Co20Fe5Zr5Ta | 65 | Ni6W | 5 | Ru | 20 | 91(Co15Cr16Pt)—6SiO2—3TiO2 |
| Example 54 | Co20Fe5Zr5Ta | 65 | Ni6W | 5 | Ru | 20 | 91(Co15Cr16Pt)—6SiO2—3TiO2 |
| Example 55 | Co20Fe5Zr5Ta | 65 | Ni6W | 5 | Ru | 20 | 91(Co15Cr16Pt)—6SiO2—3TiO2 |
| Example 56 | Co20Fe5Zr5Ta | 65 | Ni6W | 5 | Ru | 20 | 91(Co15Cr16Pt)—6SiO2—3TiO2 |

TABLE 5-continued

| | | | | | | | |
|---|---|---|---|---|---|---|---|
| Example 57 | Co20Fe5Zr5Ta | 65 | Ni6W | 5 | Ru | 20 | 91(Co15Cr16Pt)—6SiO2—3TiO2 |
| Example 58 | Co20Fe5Zr5Ta | 65 | Ni6W | 5 | Ru | 20 | 91(Co15Cr16Pt)—6SiO2—3TiO2 |
| Example 59 | Co20Fe5Zr5Ta | 65 | Ni6W | 5 | Ru | 20 | 91(Co15Cr16Pt)—6SiO2—3TiO2 |
| Example 60 | Co20Fe5Zr5Ta | 65 | Ni6W | 5 | Ru | 20 | 91(Co15Cr16Pt)—6SiO2—3TiO2 |
| Example 61 | Co20Fe5Zr5Ta | 65 | Ni6W | 5 | Ru | 20 | 91(Co15Cr16Pt)—6SiO2—3TiO2 |
| Example 62 | Co20Fe5Zr5Ta | 65 | Ni6W | 5 | Ru | 20 | 91(Co15Cr16Pt)—6SiO2—3TiO2 |
| Example 63 | Co20Fe5Zr5Ta | 65 | Ni6W | 5 | Ru | 20 | 91(Co15Cr16Pt)—6SiO2—3TiO2 |
| Example 64 | Co20Fe5Zr5Ta | 65 | Ni6W | 5 | Ru | 20 | 91(Co15Cr16Pt)—6SiO2—3TiO2 |
| Example 65 | Co20Fe5Zr5Ta | 65 | Ni6W | 5 | Ru | 20 | 91(Co15Cr16Pt)—6SiO2—3TiO2 |
| Example 66 | Co20Fe5Zr5Ta | 65 | Ni6W | 5 | Ru | 20 | 91(Co15Cr16Pt)—6SiO2—3TiO2 |

| | Magnetic layer 4a | | Nonmagnetic 7a | |
|---|---|---|---|---|
| | Ku ($\times 10^6$ erg/cm$^2$) | Thickness (nm) | Composition (mol %) | Thickness (nm) |
| Example 1 | 2.0 | 3 | 88(Co30Cr)—12TiO2 | 1 |
| Example 38 | 2.0 | 3 | 88(Co30Cr)—12TiO2 | 0.3 |
| Example 39 | 2.0 | 3 | 88(Co30Cr)—12TiO2 | 1.5 |
| Example 40 | 2.0 | 3 | 88(Co30Cr)—12TiO2 | 2 |
| Example 41 | 2.0 | 3 | 88(Co30Cr)—12TiO2 | 1 |
| Example 42 | 2.0 | 3 | 88(Co30Cr)—12TiO2 | 1 |
| Example 43 | 2.0 | 3 | 92(Co30Cr)—8TiO2 | 1 |
| Example 44 | 2.0 | 3 | 90(Co40Cr)—10SiO2 | 1 |
| Example 45 | 2.0 | 3 | Ru | 0.3 |
| Example 46 | 2.0 | 3 | Ru—10SiO2 | 0.5 |
| Example 47 | 2.0 | 3 | Ru40Co | 0.5 |
| Example 48 | 2.0 | 3 | Co40Cr | 1.2 |
| Example 49 | 2.0 | 3 | Ru10Ti | 0.4 |
| Example 50 | 2.0 | 3 | Ru20Cu | 0.3 |
| Example 51 | 2.0 | 3 | Ru10Mn | 0.3 |
| Example 52 | 2.0 | 3 | Co30Cr10Re | 1.2 |
| Example 53 | 2.0 | 3 | Ti | 0.8 |
| Example 54 | 2.0 | 3 | Y | 1 |
| Example 55 | 2.0 | 3 | Hf | 0.5 |
| Example 56 | 2.0 | 3 | 88(Co30Cr)—12TiO2 | 1 |
| Example 57 | 2.0 | 3 | 88(Co30Cr)—12TiO2 | 1 |
| Example 58 | 2.0 | 3 | 88(Co30Cr)—12TiO2 | 1 |
| Example 59 | 2.0 | 3 | 88(Co30Cr)—12TiO2 | 1 |
| Example 60 | 2.0 | 3 | 88(Co30Cr)—12TiO2 | 1 |
| Example 61 | 2.0 | 3 | 88(Co30Cr)—12TiO2 | 1 |
| Example 62 | 2.0 | 3 | 88(Co30Cr)—12TiO2 | 1 |
| Example 63 | 2.0 | 3 | 88(Co30Cr)—12TiO2 | 1 |
| Example 64 | 2.0 | 3 | 88(Co30Cr)—12TiO2 | 1 |
| Example 65 | 2.0 | 3 | 88(Co30Cr)—12TiO2 | 1 |
| Example 66 | 2.0 | 3 | 88(Co30Cr)—12TiO2 | 1 |

TABLE 6

| | Magnetic layer 4b | | | Nonmagnetic 7b | | Magnetic layer 4c | | |
|---|---|---|---|---|---|---|---|---|
| | Composition (mol %) | Ku ($\times 10^6$ erg/cm$^2$) | Thickness (nm) | Composition (mol %) | Thickness (nm) | Composition (mol %) | Ku ($\times 10^6$ erg/cm$^2$) | Thickness (nm) |
| Example 1 | 92(Co11Cr18Pt)—5SiO2—3TiO2 | 4.0 | 4 | Ru | 0.3 | Co20Cr14Pt3B | 1.5 | 4 |
| Example 38 | 92(Co11Cr18Pt)—5SiO2—3TiO2 | 4.0 | 4 | Ru | 0.3 | Co20Cr14Pt3B | 1.5 | 4 |
| Example 39 | 92(Co11Cr18Pt)—5SiO2—3TiO2 | 4.0 | 4 | Ru | 0.3 | Co20Cr14Pt3B | 1.5 | 4 |
| Example 40 | 92(Co11Cr18Pt)—5SiO2—3TiO2 | 4.0 | 4 | Ru | 0.3 | Co20Cr14Pt3B | 1.5 | 4 |
| Example 41 | 92(Co11Cr18Pt)—5SiO2—3TiO2 | 4.0 | 4 | Ru | 0.15 | Co20Cr14Pt3B | 1.5 | 4 |
| Example 42 | 92(Co11Cr18Pt)—5SiO2—3TiO2 | 4.0 | 4 | Ru | 0.5 | Co20Cr14Pt3B | 1.5 | 4 |
| Example 43 | 92(Co11Cr18Pt)—5SiO2—3TiO2 | 4.0 | 4 | Ru | 0.3 | Co20Cr14Pt3B | 1.5 | 4 |
| Example 44 | 92(Co11Cr18Pt)—5SiO2—3TiO2 | 4.0 | 4 | Ru | 0.3 | Co20Cr14Pt3B | 1.5 | 4 |
| Example 45 | 92(Co11Cr18Pt)—5SiO2—3TiO2 | 4.0 | 4 | Ru | 0.3 | Co20Cr14Pt3B | 1.5 | 4 |
| Example 46 | 92(Co11Cr18Pt)—5SiO2—3TiO2 | 4.0 | 4 | Ru | 0.3 | Co20Cr14Pt3B | 1.5 | 4 |
| Example 47 | 92(Co11Cr18Pt)—5SiO2—3TiO2 | 4.0 | 4 | Ru | 0.3 | Co20Cr14Pt3B | 1.5 | 4 |
| Example 48 | 92(Co11Cr18Pt)—5SiO2—3TiO2 | 4.0 | 4 | Ru | 0.3 | Co20Cr14Pt3B | 1.5 | 4 |
| Example 49 | 92(Co11Cr18Pt)—5SiO2—3TiO2 | 4.0 | 4 | Ru | 0.3 | Co20Cr14Pt3B | 1.5 | 4 |
| Example 50 | 92(Co11Cr18Pt)—5SiO2—3TiO2 | 4.0 | 4 | Ru | 0.3 | Co20Cr14Pt3B | 1.5 | 4 |
| Example 51 | 92(Co11Cr18Pt)—5SiO2—3TiO2 | 4.0 | 4 | Ru | 0.3 | Co20Cr14Pt3B | 1.5 | 4 |
| Example 52 | 92(Co11Cr18Pt)—5SiO2—3TiO2 | 4.0 | 4 | Ru | 0.3 | Co20Cr14Pt3B | 1.5 | 4 |
| Example 53 | 92(Co11Cr18Pt)—5SiO2—3TiO2 | 4.0 | 4 | Ru | 0.3 | Co20Cr14Pt3B | 1.5 | 4 |
| Example 54 | 92(Co11Cr18Pt)—5SiO2—3TiO2 | 4.0 | 4 | Ru | 0.3 | Co20Cr14Pt3B | 1.5 | 4 |
| Example 55 | 92(Co11Cr18Pt)—5SiO2—3TiO2 | 4.0 | 4 | Ru | 0.3 | Co20Cr14Pt3B | 1.5 | 4 |
| Example 56 | 92(Co11Cr18Pt)—5SiO2—3TiO2 | 4.0 | 4 | 88(Co30Cr)—12TiO2 | 1 | Co20Cr14Pt3B | 1.5 | 4 |
| Example 57 | 92(Co11Cr18Pt)—5SiO2—3TiO2 | 4.0 | 4 | Ru—10SiO2 | 0.5 | Co20Cr14Pt3B | 1.5 | 4 |
| Example 58 | 92(Co11Cr18Pt)—5SiO2—3TiO2 | 4.0 | 4 | Ru40Co | 0.5 | Co20Cr14Pt3B | 1.5 | 4 |

TABLE 6-continued

| | Magnetic layer 4b | | | Nonmagnetic 7b | | Magnetic layer 4c | | |
|---|---|---|---|---|---|---|---|---|
| | Composition (mol %) | Ku (×10⁶ erg/cm²) | Thickness (nm) | Composition (mol %) | Thickness (nm) | Composition (mol %) | Ku (×10⁶ erg/cm²) | Thickness (nm) |
| Example 59 | 92(Co11Cr18Pt)—5SiO2—3TiO2 | 4.0 | 4 | Co40Cr | 1.2 | Co20Cr14Pt3B | 1.5 | 4 |
| Example 60 | 92(Co11Cr18Pt)—5SiO2—3TiO2 | 4.0 | 4 | Ru10Ti | 0.4 | Co20Cr14Pt3B | 1.5 | 4 |
| Example 61 | 92(Co11Cr18Pt)—5SiO2—3TiO2 | 4.0 | 4 | Ru20Cu | 0.3 | Co20Cr14Pt3B | 1.5 | 4 |
| Example 62 | 92(Co11Cr18Pt)—5SiO2—3TiO2 | 4.0 | 4 | Ru10Mn | 0.3 | Co20Cr14Pt3B | 1.5 | 4 |
| Example 63 | 92(Co11Cr18Pt)—5SiO2—3TiO2 | 4.0 | 4 | Co30Cr10Re | 1.2 | Co20Cr14Pt3B | 1.5 | 4 |
| Example 64 | 92(Co11Cr18Pt)—5SiO2—3TiO2 | 4.0 | 4 | Ti | 0.8 | Co20Cr14Pt3B | 1.5 | 4 |
| Example 65 | 92(Co11Cr18Pt)—5SiO2—3TiO2 | 4.0 | 4 | Y | 1 | Co20Cr14Pt3B | 1.5 | 4 |
| Example 66 | 92(Co11Cr18Pt)—5SiO2—3TiO2 | 4.0 | 4 | Hf | 0.5 | Co20Cr14Pt3B | 1.5 | 4 |

TABLE 7

| | Magnetostatic characteristics | | Recording and reproducing characteristics | | Heat fluctuation (%) |
|---|---|---|---|---|---|
| | Hc (Oe) | Hn (Oe) | S/N (dB) | OW (dB) | |
| Example 1 | 4855 | 2324 | 16.8 | 37.2 | 0.4 |
| Example 38 | 4988 | 2472 | 16.5 | 34.9 | 0.4 |
| Example 39 | 4811 | 2272 | 17.1 | 39.1 | 0.4 |
| Example 40 | 4645 | 2146 | 17 | 39.9 | 0.5 |
| Example 41 | 4922 | 2411 | 16.5 | 36.4 | 0.3 |
| Example 42 | 4653 | 2179 | 16.8 | 38.5 | 0.4 |
| Example 43 | 4839 | 2344 | 16.8 | 37.4 | 0.4 |
| Example 44 | 4799 | 2310 | 16.8 | 37.1 | 0.4 |
| Example 45 | 4822 | 2235 | 16.6 | 36.9 | 0.4 |
| Example 46 | 4873 | 2273 | 16.6 | 37.2 | 0.3 |
| Example 47 | 4779 | 2423 | 16.7 | 36.7 | 0.4 |
| Example 48 | 4749 | 2210 | 16.6 | 37.1 | 0.5 |
| Example 49 | 4816 | 2284 | 16.5 | 37.2 | 0.4 |
| Example 50 | 4789 | 2302 | 16.6 | 36.7 | 0.3 |
| Example 51 | 4699 | 2184 | 16.8 | 36.2 | 0.4 |
| Example 52 | 4773 | 2300 | 16.6 | 36.4 | 0.3 |
| Example 53 | 4695 | 2235 | 16.4 | 37.2 | 0.4 |
| Example 54 | 4644 | 2194 | 16.5 | 37.5 | 0.4 |
| Example 55 | 4688 | 2204 | 16.6 | 37.6 | 0.5 |
| Example 56 | 4837 | 2374 | 16.6 | 37.1 | 0.4 |
| Example 57 | 4725 | 2189 | 16.9 | 37.6 | 0.4 |
| Example 58 | 4911 | 2483 | 17 | 37.1 | 0.4 |
| Example 59 | 4742 | 2294 | 16.6 | 36.7 | 0.4 |
| Example 60 | 4739 | 2305 | 16.8 | 37.2 | 0.3 |
| Example 61 | 4783 | 2296 | 16.9 | 36.9 | 0.3 |
| Example 62 | 4693 | 2196 | 17.1 | 37.8 | 0.5 |
| Example 63 | 4853 | 2279 | 16.6 | 36.6 | 0.3 |
| Example 64 | 4699 | 2273 | 16.6 | 37.1 | 0.5 |
| Example 65 | 4713 | 2249 | 16.7 | 37.5 | 0.5 |
| Example 66 | 4726 | 2268 | 16.7 | 37.1 | 0.5 |

Examples 67 to 73

Vertical magnetic recording mediums were obtained in the same manner as in Example 1 except that the material and film thickness of each of the soft magnetic layers were changed. The results are shown in Table 8.

TABLE 8

| | Soft magnetic under layer | | Orientation adjusting layer | | | | Magnetic layer 4a | |
|---|---|---|---|---|---|---|---|---|
| | Composition (mol %) | Bs * t (T · nm) | Composition (mol %) | Thickness (nm) | Composition (mol %) | Thickness (nm) | Composition (mol %) | Ku (×10⁶ erg/cm²) |
| Example 1 | Co20Fe5Zr5Ta | 65 | Ni6W | 5 | Ru | 20 | 91(Co15Cr16Pt)—6SiO2—3TiO2 | 2.0 |
| Example 67 | Co20Fe5Zr5Ta | 15 | Ni6W | 5 | Ru | 20 | 91(Co15Cr16Pt)—6SiO2—3TiO2 | 2.0 |
| Example 68 | Co20Fe5Zr5Ta | 25 | Ni6W | 5 | Ru | 20 | 91(Co15Cr16Pt)—6SiO2—3TiO2 | 2.0 |
| Example 69 | Co20Fe5Zr5Ta | 40 | Ni6W | 5 | Ru | 20 | 91(Co15Cr16Pt)—6SiO2—3TiO2 | 2.0 |
| Example 70 | Co5Zr5Ta | 65 | Ni6W | 5 | Ru | 20 | 91(Co15Cr16Pt)—6SiO2—3TiO2 | 2.0 |
| Example 71 | Co60Fe5Zr5Ta | 65 | Ni6W | 5 | Ru | 20 | 91(Co15Cr16Pt)—6SiO2—3TiO2 | 2.0 |
| Example 72 | Co30Fe10Ni10Ta | 65 | Ni6W | 5 | Ru | 20 | 91(Co15Cr16Pt)—6SiO2—3TiO2 | 2.0 |
| Example 73 | Fe20Ni10Al10Ta | 65 | Ni6W | 5 | Ru | 20 | 91(Co15Cr16Pt)—6SiO2—3TiO2 | 2.0 |

| | Magnetic layer 4a | Nonmagnetic 7a | | Magnetic layer 4b | | | Nonmagnetic 7b |
|---|---|---|---|---|---|---|---|
| | Thickness (nm) | Composition (mol %) | Thickness (nm) | Composition (mol %) | Ku (×10⁶ erg/cm²) | Thickness (nm) | Composition (mol %) |
| Example 1 | 3 | 88(Co30Cr)—12TiO2 | 1 | 92(Co11Cr18Pt)—5SiO2—3TiO2 | 4.0 | 4 | Ru |
| Example 67 | 3 | 88(Co30Cr)—12TiO2 | 1 | 92(Co11Cr18Pt)—5SiO2—3TiO2 | 4.0 | 4 | Ru |
| Example 68 | 3 | 88(Co30Cr)—12TiO2 | 1 | 92(Co11Cr18Pt)—5SiO2—3TiO2 | 4.0 | 4 | Ru |

TABLE 8-continued

| | | | | | | | | |
|---|---|---|---|---|---|---|---|---|
| Example 69 | 3 | 88(Co30Cr)—12TiO2 | 1 | 92(Co11Cr18Pt)—5SiO2—3TiO2 | 4.0 | 4 | Ru | |
| Example 70 | 3 | 88(Co30Cr)—12TiO2 | 1 | 92(Co11Cr18Pt)—5SiO2—3TiO2 | 4.0 | 4 | Ru | |
| Example 71 | 3 | 88(Co30Cr)—12TiO2 | 1 | 92(Co11Cr18Pt)—5SiO2—3TiO2 | 4.0 | 4 | Ru | |
| Example 72 | 3 | 88(Co30Cr)—12TiO2 | 1 | 92(Co11Cr18Pt)—5SiO2—3TiO2 | 4.0 | 4 | Ru | |
| Example 73 | 3 | 88(Co30Cr)—12TiO2 | 1 | 92(Co11Cr18Pt)—5SiO2—3TiO2 | 4.0 | 4 | Ru | |

| | Nonmagnetic 7b | Magnetic layer 4c | | | Magnetostatic characteristics | | Recording and reproducing characteristics | | Heat |
|---|---|---|---|---|---|---|---|---|---|
| | Thickness (nm) | Composition (mol %) | Ku (×10$^6$ erg/cm$^2$) | Thickness (nm) | Hc (Oe) | Hn (Oe) | S/N (dB) | OW (dB) | fluctuation (%) |
| Example 1 | 0.3 | Co20Cr14Pt3B | 1.5 | 4 | 4855 | 2324 | 16.8 | 37.2 | 0.4 |
| Example 67 | 0.3 | Co20Cr14Pt3B | 1.5 | 4 | 4673 | 2183 | 17.1 | 33.8 | 0.5 |
| Example 68 | 0.3 | Co20Cr14Pt3B | 1.5 | 4 | 4773 | 2267 | 17 | 35.9 | 0.4 |
| Example 69 | 0.3 | Co20Cr14Pt3B | 1.5 | 4 | 4897 | 2362 | 16.7 | 38.1 | 0.4 |
| Example 70 | 0.3 | Co20Cr14Pt3B | 1.5 | 4 | 4887 | 2342 | 16.9 | 38.9 | 0.4 |
| Example 71 | 0.3 | Co20Cr14Pt3B | 1.5 | 4 | 4902 | 2325 | 16.8 | 36.1 | 0.3 |
| Example 72 | 0.3 | Co20Cr14Pt3B | 1.5 | 4 | 4856 | 2341 | 16.8 | 36.8 | 0.4 |
| Example 73 | 0.3 | Co20Cr14Pt3B | 1.5 | 4 | 4955 | 2412 | 16.6 | 36.2 | 0.3 |

Examples 74 to 85

Vertical magnetic recording mediums were obtained in the same manner as in Example 1 except that the material and film thickness of each of the under film were changed. The results are shown in Tables 9 to 11.

TABLE 9

| | Soft magnetic under layer | | Orientation adjusting layer | | | | Magnetic layer 4a |
|---|---|---|---|---|---|---|---|
| | Composition (mol %) | Bs * t (T · nm) | Composition (mol %) | Thickness (nm) | Composition (mol %) | Thickness (nm) | Composition (mol %) |
| Example 1 | Co20Fe5Zr5Ta | 65 | Ni6W | 5 | Ru | 20 | 91(Co15Cr16Pt)—6SiO2—3TiO2 |
| Example 74 | Co20Fe5Zr5Ta | 65 | Cu10Ti | 8 | Ru | 20 | 91(Co15Cr16Pt)—6SiO2—3TiO2 |
| Example 75 | Co20Fe5Zr5Ta | 65 | Cu20W | 8 | Ru | 20 | 91(Co15Cr16Pt)—6SiO2—3TiO2 |
| Example 76 | Co20Fe5Zr5Ta | 65 | Co30Cr5Ti | 10 | Ru | 20 | 91(Co15Cr16Pt)—6SiO2—3TiO2 |
| Example 77 | Co20Fe5Zr5Ta | 65 | Ni10W5Mn | 6 | Ru | 20 | 91(Co15Cr16Pt)—6SiO2—3TiO2 |
| Example 78 | Co20Fe5Zr5Ta | 65 | Ni20Fe10Cr | 8 | Ru | 20 | 91(Co15Cr16Pt)—6SiO2—3TiO2 |
| Example 79 | Co20Fe5Zr5Ta | 65 | Ni6W—2SiO2 | 8 | Ru | 20 | 91(Co15Cr16Pt)—6SiO2—3TiO2 |
| Example 80 | Co20Fe5Zr5Ta | 65 | Ni6W | 5 | Ru | 10 | 91(Co15Cr16Pt)—6SiO2—3TiO2 |
| Example 81 | Co20Fe5Zr5Ta | 65 | Ni6W | 5 | Ru | 30 | 91(Co15Cr16Pt)—6SiO2—3TiO2 |
| Example 82 | Co20Fe5Zr5Ta | 65 | Ni6W | 5 | Ru20Co | 20 | 91(Co15Cr16Pt)—6SiO2—3TiO2 |
| Example 83 | Co20Fe5Zr5Ta | 65 | Ni6W | 5 | Ru10Ti | 20 | 91(Co15Cr16Pt)—6SiO2—3TiO2 |
| Example 84 | Co20Fe5Zr5Ta | 65 | Ni6W | 5 | Ru—2SiO2 | 20 | 91(Co15Cr16Pt)—6SiO2—3TiO2 |
| Example 85 | Co20Fe5Zr5Ta | 65 | Ni6W | 5 | Ru—5TaC | 20 | 91(Co15Cr16Pt)—6SiO2—3TiO2 |

| | Magnetic layer 4a | | Nonmagnetic 7a | |
|---|---|---|---|---|
| | Ku (×10$^6$ erg/cm$^2$) | Thickness (nm) | Composition (mol %) | Thickness (nm) |
| Example 1 | 2.0 | 3 | 88(Co30Cr)—12TiO2 | 1 |
| Example 74 | 2.0 | 3 | 88(Co30Cr)—12TiO2 | 1 |
| Example 75 | 2.0 | 3 | 88(Co30Cr)—12TiO2 | 1 |
| Example 76 | 2.0 | 3 | 88(Co30Cr)—12TiO2 | 1 |
| Example 77 | 2.0 | 3 | 88(Co30Cr)—12TiO2 | 1 |
| Example 78 | 2.0 | 3 | 88(Co30Cr)—12TiO2 | 1 |
| Example 79 | 2.0 | 3 | 88(Co30Cr)—12TiO2 | 1 |
| Example 80 | 2.0 | 3 | 88(Co30Cr)—12TiO2 | 1 |

TABLE 9-continued

|  |  |  |  |  |
|---|---|---|---|---|
| Example 81 | 2.0 | 3 | 88(Co30Cr)—12TiO2 | 1 |
| Example 82 | 2.0 | 3 | 88(Co30Cr)—12TiO2 | 1 |
| Example 83 | 2.0 | 3 | 88(Co30Cr)—12TiO2 | 1 |
| Example 84 | 2.0 | 3 | 88(Co30Cr)—12TiO2 | 1 |
| Example 85 | 2.0 | 3 | 88(Co30Cr)—12TiO2 | 1 |

TABLE 10

|  | Magnetic layer 4b | | | Nonmagnetic 7b | | Magnetic layer 4c | | |
|---|---|---|---|---|---|---|---|---|
|  | Composition (mol %) | Ku ($\times 10^6$ erg/cm$^2$) | Thickness (nm) | Composition (mol %) | Thickness (nm) | Composition (mol %) | Ku ($\times 10^6$ erg/cm$^2$) | Thickness (nm) |
| Example 1 | 92(Co11Cr18Pt)—5SiO2—3TiO2 | 4.0 | 4 | Ru | 0.3 | Co20Cr14Pt3B | 1.5 | 4 |
| Example 74 | 92(Co11Cr18Pt)—5SiO2—3TiO2 | 4.0 | 4 | Ru | 0.3 | Co20Cr14Pt3B | 1.5 | 4 |
| Example 75 | 92(Co11Cr18Pt)—5SiO2—3TiO2 | 4.0 | 4 | Ru | 0.3 | Co20Cr14Pt3B | 1.5 | 4 |
| Example 76 | 92(Co11Cr18Pt)—5SiO2—3TiO2 | 4.0 | 4 | Ru | 0.3 | Co20Cr14Pt3B | 1.5 | 4 |
| Example 77 | 92(Co11Cr18Pt)—5SiO2—3TiO2 | 4.0 | 4 | Ru | 0.3 | Co20Cr14Pt3B | 1.5 | 4 |
| Example 78 | 92(Co11Cr18Pt)—5SiO2—3TiO2 | 4.0 | 4 | Ru | 0.3 | Co20Cr14Pt3B | 1.5 | 4 |
| Example 79 | 92(Co11Cr18Pt)—5SiO2—3TiO2 | 4.0 | 4 | Ru | 0.3 | Co20Cr14Pt3B | 1.5 | 4 |
| Example 80 | 92(Co11Cr18Pt)—5SiO2—3TiO2 | 4.0 | 4 | Ru | 0.3 | Co20Cr14Pt3B | 1.5 | 4 |
| Example 81 | 92(Co11Cr18Pt)—5SiO2—3TiO2 | 4.0 | 4 | Ru | 0.3 | Co20Cr14Pt3B | 1.5 | 4 |
| Example 82 | 92(Co11Cr18Pt)—5SiO2—3TiO2 | 4.0 | 4 | Ru | 0.3 | Co20Cr14Pt3B | 1.5 | 4 |
| Example 83 | 92(Co11Cr18Pt)—5SiO2—3TiO2 | 4.0 | 4 | Ru | 0.3 | Co20Cr14Pt3B | 1.5 | 4 |
| Example 84 | 92(Co11Cr18Pt)—5SiO2—3TiO2 | 4.0 | 4 | Ru | 0.3 | Co20Cr14Pt3B | 1.5 | 4 |
| Example 85 | 92(Co11Cr18Pt)—5SiO2—3TiO2 | 4.0 | 4 | Ru | 0.3 | Co20Cr14Pt3B | 1.5 | 4 |

TABLE 11

|  | Magnetostatic characteristics | | Recording and reproducing characteristics | | Heat fluctuation (%) |
|---|---|---|---|---|---|
|  | Hc (Oe) | Hn (Oe) | S/N (dB) | OW (dB) | |
| Example 1 | 4855 | 2324 | 16.8 | 37.2 | 0.4 |
| Example 74 | 4567 | 2066 | 17.3 | 39.5 | 0.6 |
| Example 75 | 4511 | 2014 | 17.2 | 39.8 | 0.7 |
| Example 76 | 4666 | 2100 | 16.9 | 37.9 | 0.5 |
| Example 77 | 4811 | 2215 | 16.7 | 37.4 | 0.5 |
| Example 78 | 4935 | 2418 | 16.8 | 36.5 | 0.4 |
| Example 79 | 4692 | 2311 | 16.8 | 37.1 | 0.4 |
| Example 80 | 4681 | 2190 | 16.6 | 39.8 | 0.5 |
| Example 81 | 4983 | 2429 | 17.1 | 34.8 | 0.2 |
| Example 82 | 4769 | 2267 | 16.9 | 36.8 | 0.3 |
| Example 83 | 4782 | 2183 | 16.9 | 37.1 | 0.4 |
| Example 84 | 4692 | 2201 | 17.1 | 36.6 | 0.5 |
| Example 85 | 4882 | 2328 | 16.9 | 36.5 | 0.3 |

Examples 86 to 88

Vertical recording mediums were obtained in the same manner as in Example 1 except that the total number of magnetic layers was varied. The results are shown in Table 12.

TABLE 12

|  | Soft magnetic under layer | | Orientation adjusting layer | | | | Magnetic layer 4a | |
|---|---|---|---|---|---|---|---|---|
|  | Composition (mol %) | Bs * t (T · nm) | Composition (mol %) | Thickness (nm) | Composition (mol %) | Thickness (nm) | Composition (mol %) | Ku ($\times 10^6$ erg/cm$^2$) |
| Example 1 | Co20Fe5Zr5Ta | 65 | Ni6W | 5 | Ru | 20 | 91(Co15Cr16Pt)—6SiO2—3TiO2 | 2.0 |
| Example 86 | Co20Fe5Zr5Ta | 65 | Ni6W | 5 | Ru | 20 | 91(Co15Cr16Pt)—6SiO2—3TiO2 | 2.0 |
| Example 87 | Co20Fe5Zr5Ta | 65 | Ni6W | 5 | Ru | 20 | 91(Co15Cr16Pt)—6SiO2—3TiO2 | 2.0 |
| Example 88 | Co20Fe5Zr5Ta | 65 | Ni6W | 5 | Ru | 20 | 91(Co15Cr16Pt)—6SiO2—3TiO2 | 2.0 |

TABLE 12-continued

| | Magnetic layer 4a | Nonmagnetic 7a | | Magnetic layer 4b | | | Nonmagnetic 7b |
| | Thickness (nm) | Composition (mol %) | Thickness (nm) | Composition (mol %) | Ku ($\times 10^6$ erg/cm$^2$) | Thickness (nm) | Composition (mol %) |
|---|---|---|---|---|---|---|---|
| Example 1 | 3 | 88(Co30Cr)—12TiO2 | 1 | 92(Co11Cr18Pt)—5SiO2—3TiO2 | 4.0 | 4 | Ru |
| Example 86 | 3 | 88(Co30Cr)—12TiO2 | 1 | 92(Co11Cr18Pt)—5SiO2—3TiO2 | 4.0 | 4 | Ru |
| Example 87 | 3 | 88(Co30Cr)—12TiO2 | 1 | 92(Co11Cr18Pt)—5SiO2—3TiO2 | 4.0 | 3 | Ru |
| Example 88 | 3 | 88(Co30Cr)—12TiO2 | 1 | 92(Co11Cr18Pt)—5SiO2—3TiO2 | 4.0 | 3 | Ru |

| | Nonmagnetic 7b | Magnetic layer 4c | | | Nonmagnetic 7c | | Magnetic layer 4d |
| | Thickness (nm) | Composition (mol %) | Ku ($\times 10^6$ erg/cm$^2$) | Thickness (nm) | Composition (mol %) | Thickness (nm) | Composition (mol %) |
|---|---|---|---|---|---|---|---|
| Example 1 | 0.3 | Co20Cr14Pt3B | 1.5 | 4 | — | — | — |
| Example 86 | 0.3 | Co20Cr14Pt3B | 1.5 | 2 | Ru | 0.3 | Co20Cr14Pt3B |
| Example 87 | 0.3 | 92(Co11Cr18Pt)—5SiO2—3TiO2 | 4.0 | 3 | Ru | 0.3 | Co20Cr14Pt3B |
| Example 88 | 0.3 | 92(Co11Cr18Pt)—5SiO2—3TiO2 | 4.0 | 3 | Ru | 0.3 | 92(Co11Cr18Pt)—5SiO2—3TiO2 |

| | Magnetic layer 4d | Nonmagnetic 7d | | Magnetic layer 4e | | | Magnetostatic characteristics | | Recording and reproducing characteristics | | Heat fluctuation (%) |
| | Ku ($\times 10^6$ erg/cm$^2$) | Thickness (nm) | Composition (mol %) | Thickness (nm) | Composition (mol %) | Ku ($\times 10^6$ erg/cm$^2$) | Thickness (nm) | Hc (Oe) | Hn (Oe) | S/N (dB) | OW (dB) | |
|---|---|---|---|---|---|---|---|---|---|---|---|---|
| Example 1 | — | — | — | — | — | — | — | 4855 | 2324 | 16.8 | 37.2 | 0.4 |
| Example 86 | 1.5 | 2 | — | — | — | — | — | 4980 | 2218 | 16.8 | 36.2 | 0.4 |
| Example 87 | 1.5 | 4 | — | — | — | — | — | 4799 | 2184 | 17.3 | 36.5 | 0.3 |
| Example 88 | 4.0 | 3 | Ru | 0.3 | Co20Cr14Pt3B | 1.5 | 4 | 4755 | 2089 | 17.5 | 36.4 | 0.6 |

As shown in Tables 2 to 12, a magnetic recording medium which has excellent electromagnetic conversion characteristics and complies with high-density recording was obtained by the invention of the patent application of this case.

What is claimed is:

1. A magnetic recording medium comprising a nonmagnetic substrate on which at least a soft magnetic under layer, an orientation adjusting layer that controls the orientation of a layer just thereon, a vertical magnetic layer with an axis of easy magnetization being mainly oriented vertically to the nonmagnetic substrate and a protective layer are disposed, the vertical magnetic layer being constituted of three or more layers including a lower layer, an intermediate layer and an upper layer from the substrate side, wherein the lower, intermediate and upper magnetic layers are constituted of magnetic particles which are columnar crystals extending continuously from the lower layer to the upper layer such that the magnetic particles epitaxially extend one-on-one from each magnetic layer to the other magnetic layers, the magnetic recording medium further comprising a nonmagnetic layer between the lower and intermediate magnetic layers or between the intermediate and upper magnetic layers, wherein the upper layer has a magnetic anisotropic constant (Ku) ranging from $0.8 \times 10^6$ to $4 \times 10^6$ (erg/cc), the intermediate layer has a magnetic anisotropic constant (Ku) ranging from $2 \times 10^6$ to $7 \times 10^6$ (erg/cc) and the lower layer has a magnetic anisotropic constant (Ku) ranging from $1 \times 10^6$ to $4 \times 10^6$ (erg/cc), and the lower, intermediate and upper magnetic layers are bound by ferro-coupling, wherein the Kus of said upper, intermediate and lower magnetic layers have the following relation: Ku of the upper layer<Ku of the lower layer<Ku of the intermediate layer, and wherein said lower and intermediate magnetic layers are magnetic layers having a granular structure in which the surrounding of the columnar magnetic particle is coated with an oxide and said upper magnetic layer is a magnetic layer containing no oxide.

2. A magnetic recording medium according to claim 1, wherein any one or more of said lower, intermediate and upper magnetic layers is a magnetic layer having a granular structure in which the surrounding of the columnar magnetic particle is coated with an oxide.

3. A magnetic recording medium according to claim 1, wherein the nonmagnetic layer between the lower and intermediate magnetic layers is a nonmagnetic layer having a granular structure.

4. A magnetic recording medium according to claim 1, wherein the product (Ms×t) of the saturation magnetization (Ms) and film thickness (t) of the magnetic layer constituting the intermediate layer is larger than the product (Ms×t) of each magnetic layer constituting the lower and upper magnetic layers.

5. A magnetic recording medium according to claim 1, wherein the magnetic recording medium further comprising a nonmagnetic under layer between the orientation adjusting layer and the vertical magnetic layer.

6. A magnetic recording and reproducing device comprising a magnetic recording medium and a magnetic head that records information in and reproduces the information from the magnetic recording medium, wherein the magnetic recording medium is the magnetic recording medium according to claim 1.

* * * * *